(12) United States Patent
Lowensohn et al.

(10) Patent No.: US 7,069,444 B2
(45) Date of Patent: Jun. 27, 2006

(54) PORTABLE WIRELESS ACCESS TO COMPUTER-BASED SYSTEMS

(75) Inventors: Brent A. Lowensohn, 4912 Gloria Ave., Encino, CA (US) 91436; David A. Bellenger, Kagel Canyon, CA (US); Jimmy E. Braun, Orange, CA (US); Richard C. Grosser, Sherman Oaks, CA (US); David L. Thompson, Winnetka, CA (US); William J. Woodmancy, La Crescenta, CA (US); Steven R. Pomerantz, Stevenson Ranch, CA (US)

(73) Assignee: Brent A. Lowensohn, Encino, CA (US)

( * ) Notice: Subject to any disclaimer, the term of this patent is extended or adjusted under 35 U.S.C. 154(b) by 831 days.

(21) Appl. No.: 10/058,233

(22) Filed: Jan. 25, 2002

(65) Prior Publication Data

US 2004/0230809 A1    Nov. 18, 2004

(51) Int. Cl.
*H04L 9/10* (2006.01)
*H04L 29/02* (2006.01)

(52) U.S. Cl. ........................... 713/185; 713/186
(58) Field of Classification Search ............ 726/20
See application file for complete search history.

(56) References Cited

U.S. PATENT DOCUMENTS

| | | | |
|---|---|---|---|
| 5,311,185 A | 5/1994 | Hochstein et al. ............ 342/44 |
| 5,361,019 A | 11/1994 | Angott et al. ................ 315/324 |
| 5,365,214 A | 11/1994 | Angott et al. ................ 340/328 |
| 5,402,469 A | 3/1995 | Hopper et al. ................ 379/93 |
| 5,534,855 A | 7/1996 | Shockley et al. ......... 340/825.3 |
| 5,543,797 A | 8/1996 | Hochstein et al. ............ 342/42 |
| 5,568,122 A | 10/1996 | Xydis ........................ 340/539 |
| 5,612,666 A | 3/1997 | Xydis ...................... 340/384.1 |
| 5,663,731 A | 9/1997 | Theodoras, II et al. ....... 342/70 |
| 5,680,102 A | 10/1997 | Xydis ........................ 340/539 |
| 5,680,112 A | 10/1997 | Xydis ........................ 340/636 |
| 5,757,267 A | 5/1998 | Xydis ........................ 340/330 |
| 5,757,305 A | 5/1998 | Xydis ........................ 341/173 |
| 5,774,041 A | 6/1998 | Xydis et al. ............. 340/396.1 |
| 5,883,576 A * | 3/1999 | De La Huerga ......... 340/573.1 |
| 5,903,225 A | 5/1999 | Schmitt et al. ........ 340/825.31 |
| 5,911,670 A | 6/1999 | Angott et al. ................ 56/10.2 |
| 5,943,423 A | 8/1999 | Muftic ........................ 380/25 |
| 5,960,085 A | 9/1999 | de la Huerga | |

(Continued)

OTHER PUBLICATIONS

Micron Communications, Inc., "A message from John Tuttle, President, Micron Communications, Inc.", Mar. 12, 1997.

(Continued)

*Primary Examiner*—Gilberto Barron, Jr.
*Assistant Examiner*—Venkat Perungavoor
(74) *Attorney, Agent, or Firm*—Charles G. Call

(57) ABSTRACT

A portable wireless system for providing a user with access to a computer-based system includes a BARB Badge to interface with the user's body, responsive to a disruption in the interface and including a transceiver to communicate with an external source, a BARB Base to detect a presence of said BARB Badge in a vicinity of said BARB Base and relay secure communications between said BARB Badge and said computer-based system; and an administrator subsystem to regulate interfacing operations of said BARB Badge and said computer-based system based on predetermined administrative protocols. In this way, the overall security of the computer-based system is enhanced while the amount of operational burdens associated with accessing the computer-based system are reduced.

27 Claims, 21 Drawing Sheets

U.S. PATENT DOCUMENTS

| | | | |
|---|---|---|---|
| 5,963,908 A | 10/1999 | Chadha | 704/273 |
| 6,009,358 A | 12/1999 | Angott et al. | 701/25 |
| 6,035,406 A | 3/2000 | Moussa et al. | 713/202 |
| 6,043,746 A * | 3/2000 | Sorrells | 340/572.7 |
| 6,070,240 A | 5/2000 | Xydis | 713/200 |
| 6,175,298 B1 | 1/2001 | Xydis | 340/392.1 |
| 6,189,105 B1 * | 2/2001 | Lopes | 726/20 |
| 6,212,448 B1 | 4/2001 | Xydis | 701/23 |
| 6,252,358 B1 | 6/2001 | Xydis et al. | 315/295 |
| 6,259,355 B1 | 7/2001 | Chaco et al. | |
| 6,307,471 B1 | 10/2001 | Xydis | 340/568.1 |
| 6,335,688 B1 | 1/2002 | Sweatte | |
| 6,346,886 B1 * | 2/2002 | De La Huerga | 340/573.1 |
| 6,774,796 B1 | 8/2004 | Smith | |
| 6,778,066 B1 | 8/2004 | Smith | |
| 6,836,843 B1 | 12/2004 | Seroussi et al. | |
| 2002/0129285 A1 * | 9/2002 | Kuwata et al. | 713/202 |
| 2002/0165731 A1 * | 11/2002 | Dempsey | 705/1 |
| 2002/0178367 A1 * | 11/2002 | Hamid et al. | 713/186 |

OTHER PUBLICATIONS

Ensure Technologies, "XyLoc Solo Quick Start", pp. 1-6, Jan. 2000.

Micron Communications, Inc., "The MicroStamp Family of Products", pp. 1-2, Mar. 12, 1997.

Micron Communications, Inc., "MicroStamp Engine Modulated Backscatter (MBS) Version Preliminary Data Sheet", pp. 1-3, Mar. 12, 1997.

Ken Phillips, PCWEEK, "Air ID Eliminates Passwords", Review: RF Ideas' device uses radio waves to detect users' presence, p. 1, Mar. 23, 1998.

RF IDeas Inc., "RF Ideas Launches Flagship AIR ID® Wireless Desktop Security Solutioin", pp., 1-3, Feb. 2, 1998.

RF Ideas Inc., "AIR ID Specifications", p. 1, Feb. 2, 1998.

Julie Nash, Micro Technology, entitled, "Micron Communications, Inc., Announces Product Introduction of Ambit GPS + High Performance RFID Unit", p. 1-2, Jan. 18, 1996.

HID Corporation, Proximity catalog, 1999, 7 pages.

* cited by examiner

PORTABLE WIRELESS ACCESS TO COMPUTER-BASED SYSTEMS

FIELD OF THE INVENTION

The present invention is generally directed to the field of wireless user authentication, identification and data interfacing. More particularly, the present invention is directed to wireless authentication, identification and data interfacing with a computer-based system.

BACKGROUND OF THE INVENTION

The use of user authentication, identification and data interfacing protocols which regulate the flow of data communication between two systems, has long been known in the art. Presently, user authentication, identification and data interfacing protocols are in widespread use for accessing nearly all types of systems ranging from stand-alone personal computers to sophisticated networked supercomputers. As a result, user authentication, identification and data interfacing form an integral part of accessing most computer-based systems in use today.

These user authentication, identification and data interfacing protocols have been developed in a wide variety of electronic manufacturing and software design configurations, depending upon the intended need at the implementation site. Generally, the existing user authentication, identification and data interfacing protocols require a user to enter a username and password at a computer terminal connected to a computer network in order to gain access to the network. The network computer then verifies the validity of the entered data by checking it against stored data prior to granting access to the network.

While an effective approach for obtaining user authentication and identification, the foregoing access method is not without shortcomings. One shortcoming of this approach is its susceptibility to unwanted outside intrusions which compromise the security of the system. Currently, a user's request for access to the system is generally accomplished by a user entering their username and password into the system via a keyboard. This allows for an outside observer to perceive the user's actions, such as the keys typed on the keyboard, in determining the user's access code for subsequent unauthorized access to the user's account. Another shortcoming is the requirement for a user to enter a username and password into a computer terminal each time the user tries to access the system via a different terminal. For example, in the environment of a computer-networked medical care setting, a doctor may access an account containing medical data and patient's profiles from any of the networked computer terminals located in the medical care setting such as those in their office or the operating room, but is required to enter a username and password with each separate access such as those from the same or a different terminal. This increases the risk of an onlooker being able to determine the doctor's access code. In addition, the requirement to enter a username and password at each different terminal can be quite cumbersome to a doctor who must readily remember the username and password and make no typographical errors in entering them into the system, resulting in an inefficient use of the doctor's time. Physical contact with a keyboard also requires the use of the hands which may be otherwise occupied, thus adding to the difficulty of accessing the system. Also, in some ultra-clean environments, such as a medical care setting where a surgeon's hands may be sterilized particularly during or in preparation for a surgery, the requirement to make physical contact with a keyboard may detract from the sterility of a surgeon's hand. In addition, most systems in use today also require that the user log off from the system in order to terminate a session. This also increases the risk of unauthorized access to the account when an already accessed terminal is left unattended and logged in. The requirement to log off can be inefficient and cumbersome.

Other systems in use today may automatically log the user off after a terminal is left unattended for a predetermined period of time. These systems rely on the lack of the user-activity on the terminal as a means to determine whether a user has completed usage of the terminal. The shortcoming of this approach is that the preset time may be still prove to be too long in some cases and too short in others, thus allowing for interim unauthorized access or annoying the user with the repeated need to re-log in. Unauthorized users may also prevent the automatic log off simply by making inputs periodically since the computer has no way of distinguishing whether an entry is made by an authorized user or an unauthorized one once the session is started The present invention therefore introduces a system to increase the overall security associated with computer access while reducing the amount of operational burdens placed on users of such a computer.

SUMMARY

In one aspect of the invention, a roaming authentication and ID badge holder (hereinafter referred to as "BARB Badge") provides a mechanism for allowing a user to access a computer-based system. The BARB Badge includes a communications subsystem to establish secure communications with the computer-based system. Communications are established based upon proximity of the user's BARB Badge to an access point of the computer-based system. The BARB Badge includes memory to store user identification and authorization information for transmission to the access point of the computer-based system. Optionally a human interface subsystem is included to verify that the BARB Badge has been attached to or in uninterrupted contact with the user since its activation. The human interface subsystem may communicate its status to the computer-based system.

In another aspect of the invention, a system for utilizing a BARB Badge includes a base station (herein after referred to as a "BARB Base") conceived and designed to provide secure communications between a computer-based system and the BARB Badge. The BARB Badge is conceived and designed to interface with a user's body and is responsive to a disruption in that interface. The BARB Badge includes a transceiver to communicate with an external source, such as a BARB Base. The BARB Base is conceived and designed to detect a presence of a BARB Badge in its vicinity and to facilitate secure communications between the BARB Badge and the computer-based system. An administrator subsystem may also be provided which is conceived and designed to control interfacing operations of a user authentication and identification in subsystem and portion of the computer-based system based on predetermined administrative protocols.

The BARB Base includes: a communication subsystem conceived and designed to p provide secure communications between the computer-based system and the BARB Badge, a sensor subsystem conceived and designed to detect a presence of a BARB Badge in a vicinity of the BARB Base and to establish secure communications between the BARB Badge and the computer-based system, a recognition subsystem to uniquely identify a particular unique BARB Badge from a plurality of unique BARB Badges detected by the sensor subsystem and to establish secure communication between the particular unique BARB Badge and the computer-based system, and a feedback subsystem to provide a user with feedback on operations of the user authentication and identification subsystem.

In yet another aspect of the invention, an administrator subsystem conceived and designed to control interfacing operations of a computer-based system conceived and designed to interface with a BARB Badge is also provided. The administrator subsystem includes an authentication subsystem conceived and designed to authenticate a user based on valid user-supplied data, to activate a BARB Badge corresponding to the user, and to store user authentication and identification data on the activated BARB badge, and then a login subsystem conceived and designed to use secure communication with the computer-based system to verify user authentication and identification data received from the BARB badge, wherein the login subsystem grants the user of the BARB Badge access to said computer-based system in response to said verification.

The aforementioned summary description of various aspects of the invention is intended to only provide an overview of the exemplary embodiments of the present invention. A more detailed understanding of these features, and of additional features, and advantages of the present invention will be provided to those skilled in the art from a consideration of the following Detailed Description of the Invention, taken in conjunction with the accompanying Drawings, which will now first be briefly described.

BRIEF DESCRIPTION OF THE DRAWINGS

The accompanying drawings, which are incorporated into and constitute a part of this specification, illustrate one or more exemplary embodiments of the present invention, and together with the detailed description, serve to explain the principles and exemplary implementations of the invention.

In the drawings.

DETAILED DESCRIPTION OF THE INVENTION

Various exemplary embodiments of the invention are described herein in the context of a system providing user authentication and access to a computer-based system via a wireless BARB Badge carried by the user. Those of ordinary skill in the art will realize that the following detailed description of the invention is illustrative only and is not intended to be in any way limiting. Other embodiments of the invention will readily suggest themselves to such skilled persons having the benefit of this disclosure. Reference will now be made in detail to exemplary implementations of the invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
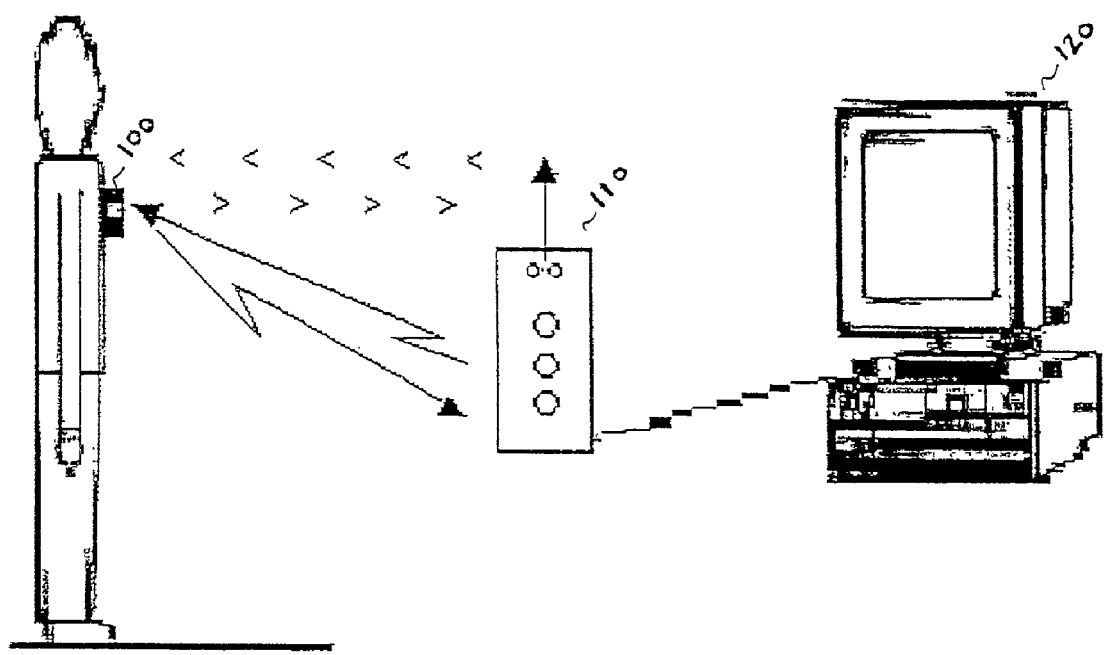
FIG. 1 is an overall system block diagram of an embodiment of the present invention.

Referring now more particularly to the Drawings, the invention is directed to providing user access to a computer-based system. As shown in FIG. 1 the overall system includes a BARB Badge 100, a BARB Base 110 and an administrator subsystem 120. As disclosed in greater detail in conjunction with FIGS. 2–19, the BARB Badge 100 includes a transceiver that can communicate with an external source such as a BARB Base and interface with a user's body. The user authentication and identification portable system 100 is also responsive to a disruption in the interface with the user body and can notify external sources such as a BARB Base of such disruptions. The secure communication can be via IR and/or RF using any form of secure data transmission provided by the operating system or a third party. The BARB Base 110 can detect the presence of BARB Badges in its vicinity and can facilitate the communication of information via secure communications between the BARB badge and the computer-based system. The administrator subsystem 120 controls the various interfacing operations of the BARB Badge 100 with the computer-based system based on predetermined conventional administrative protocols.

The overall operations of the invention are now explained. In the interest of simplicity, a computer networked medical/healthcare environment such as a medical care facility is used as an example throughout the specification, although the invention is not in any way intended to be limited to a medical care setting. Prior to obtaining a BARB Badge 100, a user is first required to undergo a one-time enrollment (registration) process ("activation") during which the identity of the user is verified. The verification can include the user entry of username and password on a computer console, as well as other means of authentication and identification such as biometric data entry, including fingerprint, iris scan, and other biometric technologies, as well as entry of additional alternative credentials and data unique to the individual such as social security number and the like. The administrator subsystem 120 first verifies the various user-provided data by comparing them with information stored, for example, on a database, then stores the data into an activated BARB Badge 100 worn by the user, such as by means of radio RF or infrared IR signals or a detachable wire-connection. After the initial enrollment (registration) process is completed, the user is free to move about the facility while wearing the activated BARB Badge 100.

The user environment is optionally equipped with a plurality of BARB Bases, 110 which are situated at predetermined locations. Each BARB Base 110 can detect the presence of BARB Badges 100 in its vicinity and can relay the collected data via secure communications between the BARB badge and the computer-based system. Once a user enters a specific room, such as an office, to access the computer-based system via a networked terminal, the BARB Base 110 in that office detects the presence of the BARB Badge 100, establishes secure communication with the BARB Badge 100 and securely transmits the personal information stored therein to the terminal. The securely relayed information is processed by the administrator subsystem 120 which, after verification, grants the user access to the terminal. The user is then free to operate the terminal, such as by downloading and viewing files, storing new data, and the like all consistent with predetermined privileges granted that user on the computer-based system.

One advantage of the foregoing feature of the invention over the prior art is that the user is no longer required to personally enter all the required login data into each accessed computer terminal as this is now done by the invention without user intervention. In addition to reducing the cumbersome login process, the risk of compromising the security of the system is also reduced by not allowing someone in the room, such as a patient, to view a traditional login process of letters typed with a keyboard. This thus simplifies centralizing authentication and identification of records, and minimizes the need for widespread access to such centralized records by providing authentication credentials that travel with the user. Further capabilities incorporated into the BARB Badge 100, such as storing and transporting small amounts of relevant data with the human user system can also simplify working situations in the absence of network connectivity.

The various functional and hardware aspects of the invention will now be discussed in greater detail in conjunction with the figures.

Figure 2:
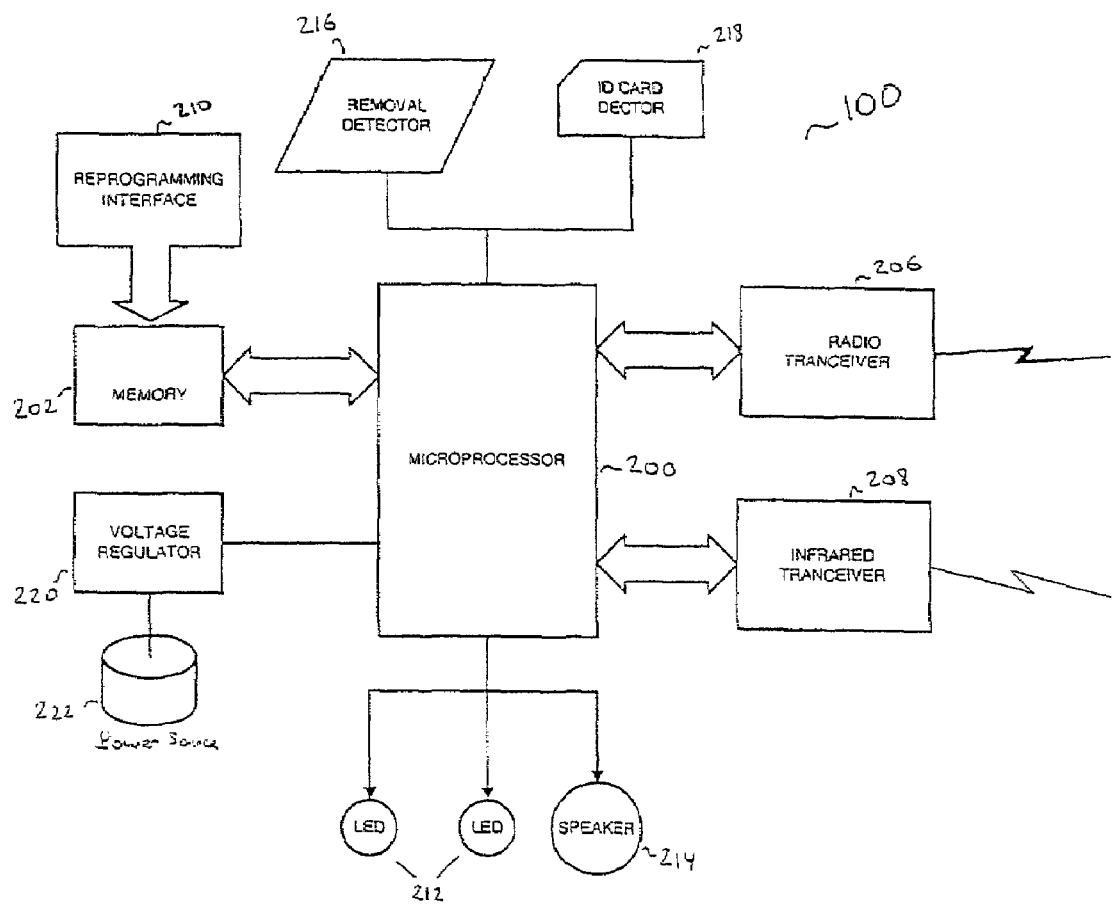
FIG. 2 is a system block diagram of the BARB Badge in accordance with one embodiment of the present invention.

FIG. 2 is a hardware block diagram of an embodiment of the BARB Badge 100, which provides automatic user authentication and identification as well as data transport services. As shown, the BARB Badge 100 includes microprocessor 200, data storage unit (memory) 202, transceiver units such as radio-frequency transceiver 206 and infrared transceiver 208, a reprogramming interface unit 210, and feedback LEDs such as Light Emitting Diodes (LEDs) 212 and acoustic transducer such as a speaker/beeper 214, sensor units such as removal detector 216, ID-card detector 218, and the associated power units such as power source 222 and voltage regulator 220.

The BARB Badge 100 can securely communicate with the BARB Base 110 when within range, identify itself and its status, store data such as user credentials and health parameters, and provide some task-related feedback to the user in the form of flashing lights emanating from the LEDs 212 and/or an audible tone generated by the speaker/beeper 214. The transceiver units include a radio frequency link (RF) 206 that provides long-range (room scale), low speed secure communication, and an infrared (IR) link 208 that provides short-range (few feet) but high-speed secure communication as well as field of view (FOV) detection. The BARB Badge 100 is also equipped with a small amount of memory in the form of data storage unit 202 that can be used to transport data and programming instructions used by reprogramming unit 210. The data storage unit 202 may also include an Electronic Erasable Programmable Read Only Memory (EEPROM) so that data can be both stored and retrieved. In addition, the BARB Badge 100 includes 1) flashing lights and a sound beeper to provide feedback to the user or to security professionals, and 2) sensors to help detect when the BARB Badge 100 has been removed from the user-body or when an ID-card has been inserted into the BARB Badge 100. In an exemplary embodiment, the BARB Badge 100 contains a physical badge holder which can be used to add an additional level of system security (as with a photo ID badge), as well as a portable power source unit 222 such as a battery for providing power to the BARB Badge 100.

The removal detector sensor unit 216 can determine whether there has been a disruption in the interfacing of the BARB Badge 100 with the user's body, such as its removal from a user's body, and has the ability to notify any BARB Base 110 of the disruption via one of the transceiver units. In an exemplary embodiment of the present invention the sensor unit 216 may include one or more sensors for monitoring changes in capacitance, inductance, humidity, acceleration, temperature, and transmiscivity of a signal through the user body to determine if the BARB Badge 100 has been removed from a user's body. This determination is based on the deviations of one or more of the above mentioned factors, unique to that user's body. Optionally, upon such removal or disruption in the interface or ID Card removal, the BARB Badge 100 will self-erase all stored user data so that access to the computer-based system may no longer be granted to its wearer. Additionally, the administrator subsystem 120 can deactivate the BARB Badge 100 as a further security precaution against unauthorized access. One advantage of the foregoing features of the invention over the prior art is that by sensing the interfacing disruptions between the BARB Badge 100 and the user's body and consequent deactivation of the BARB Badge 100, the possibility of unauthorized access to the computer-based system via transfer of a BARB Badge 100 from one user to another, such as in the event of theft, is virtually eliminated.

Other exemplary embodiments include assigning a preset "time-to-live" to each BARB Badge 100 which establishes a lifetime during which the status of the BARB Badge 100 remains valid. Upon expiration of the time period, the BARB Badge 100 will self-erase all stored user data so that access to the computer-based system may no longer be granted to the user. Another exemplary embodiment includes a digital authentication and an identifier by which a unique number is assigned to each BARB Badge 100 so that the BARB Base 110 can better detect a particular BARB Badge 100.

Figure 3:
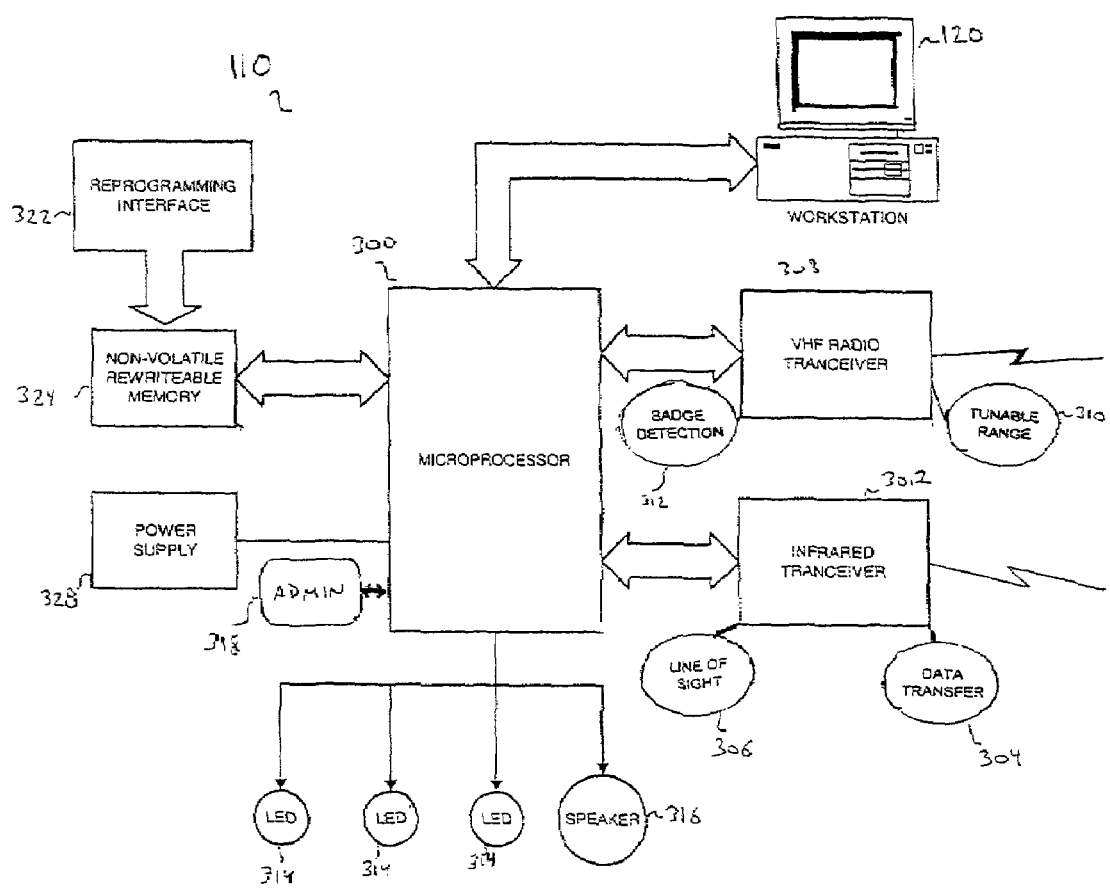
FIG. 3 is a system block diagram of the BARB Base in accordance with one embodiment of the present invention.

FIG. 3 is a hardware block diagram of a BARB Base 110 which is an interface between a BARB Badge 100 and a computer terminal of the computer-based system. As shown, the BARB Base 110 includes a microprocessor 300, infrared secure communication (IR) unit 302 in operative contact with the line of sight module 306 and data transfer unit 304, the radio frequency (RF) transceiver unit 308 in operative contact with the BARB Badge 100 detection unit 312 and tunable range unit 310, feedback modules such as Light Emitting Diode (LED) 314 and beeper 316, and the administrative unit 318.

The basic function of the BARB Base 110 is to securely communicate information to and from the BARB Badges 100 through the IR 302 and RF 308 data links. BARB Base 110 can also have a wire-based secure communication with a computer terminal such as via a serial or USB port or a wired or optical TCP/IP connection to the computer platform. Additionally, as explained below in greater detail, the IR 302 and RF 308 data links are used by the BARB Base 110 to detect if a given BARB Badge 100 is within line of sight (a.k.a. "sight detection").

A BARB Base 110 first senses the presence of a BARB Badges 100 through detection of a predetermined emitted RF frequency from the RF 206 that has come within range of the BARB Base 110. The BARB Base 110 then begins the preliminary stages of login but does not grant access to the terminal until a sight detection has been established as well. The sight detection requires that the IR link be within a predetermined viewing field range of the BARB Base 110. One advantage of the foregoing feature of the present invention over the prior art is that by sensing the RF frequency and by beginning the preliminary stages of the login process, the granting of access is thereby expedited in the event of a sight detection, however, the security of the system is not compromised unless the user actually desires to access the terminal by establishing the IR link as well. This is particularly helpful in avoiding otherwise unwanted multiple access when more than one BARB Badge comes within RF range of the BARB Base. In an exemplary embodiment, the RF frequency is a common standard RF frequency for any commercially available wireless devices. This offers a good trade-off between high frequency (data rate, bandwidth) and low-frequency (RF penetration, resistance to human shielding effects). In an exemplary embodiment, the IR must also be received within a predetermined viewing field range of the BARB Base 110, such as within a 30 degree cone about the center of the IR sensor on the BARB Base 110.

In an exemplary embodiment, the BARB Base 110 will be able to uniquely identify and communicate with multiple BARB Badges 100 within the RF range. The authentication and identification of each BARB Badge 100 is based on the unique number assigned to each BARB Badge 100 and securely communicated to the BARB Base 110. A discovery algorithm may also be used to better enable the BARB Base 110 to detect new BARB Badges 100 which come within RF range of the BARB Base 110. In the event of multiple BARB Badges 100 within RF range of the BARB Base 110, a BARB Base 110 will continue to communicate reliably with the pre-existing BARB Badges 100 as more BARB Badges 100 enter RF range. The BARB Base 110 may also have an electronically tunable power output range over at least 3 settings, where one of the settings is a no output setting.

The user is also provided with feedback via one or both of the LED units 314, and the beeper 316. One purpose of the feedback is to notify the user if a download/upload or login is in progress, and whether it has been successful. The notification is done through a predetermined series of one of flashing lights emanating from the LED unit 314 or the beeping of beeper 316.

In an exemplary embodiment, the BARB Base 110 can also notify the user of the BARB Badge 100, or an external source, as to the user's entry or exit of an area in the building for which the user does not have clearance for entering or leaving, such as restricted wards of a medical care setting, or areas in which only a specified group of personnel may enter or leave. The BARB Base 110 also securely communicates with an external database containing security clearance for the users to verify the authenticated and identified user's clearance to enter or leave an area prior to sending the notification. One advantage of the foregoing feature of the invention is that the BARB Bases can be used as security beacons which provide alert feedbacks to increase the overall security of the networked environment.

The administrative unit 318 coordinates the internal operational aspects of the BARB Base 110 as well as the interaction between the BARB Base 110 and the external devices such as BARB Badges 100 and the administrator subsystem 120. At the core of the administrative unit 318 is an administrative program implemented in hardware or software and used by the applications that are enabled to use the system to securely communicate with the BARB Base 110 and to access the services provided by the system.

In an exemplary embodiment, the administrative program is a dynamic linked library (DLL) or other such subsystem that will interface to the operating system in use by the BARB Base (e.g. Microsoft Windows©, Linux, MAC OS© or others) that will provide library calls implementing the various levels of functionality. The most basic level of functionality will be the transfer of encoded data to and from a device; this data will include both instructions for a BARB Base 110 connected to a computer port, and instructions and data for onward transmission to one or more of the BARB Badges 100. The software will utilize this functionality for sending commands and providing the authentication and identification, and data transport services to the applications that use the software, as well as providing the ability to set up a particular BARB Badge 100 (e.g., reset, determine status, write user data, set "time to live", etc).

In an exemplary embodiment, data management is accomplished by the BARB Badge 100. Each user data element will consist of three parts: data tag authentication and identifier, data value, and access password. The software supports the reading, writing and deletion of individual data elements. The software also supports a "delete all" function protected by a global password, and implements a challenge-response scheme for data access. Support for event notification programs request notification of events such as a specific BARB Badge 100 entering or leaving either RF or IR range of a BARB Base 110, as well as continuous signals indicating that a specific BARB Badge 100 is still in range of the BARB Base 110.

The software also supports a system enumeration function to allow a count to be taken of all the BARB Badges 100 within RF or IR range of a BARB Base 110. Typically the IR enumeration will be directional and will provide a field-of-view (FOV) count that is used to determine the presence of a BARB Badge 100 within line-of-sight of a specific BARB Base.

In an exemplary embodiment, the software has the ability to access the history of a particular BARB Badge 100. Each sensor 216 in each BARB Badges 100 will provide reference information about whether or not a BARB Badge 100 has been removed. The software also provides functions to let an application retrieve and modify this information in real time.

Other features of the software include providing a capability for providing limited safeguards integrated into the device against RF and IR replay, and man-in-the-middle attacks. In an exemplary embodiment, a random message sequence ID number scheme is adopted as the limited safeguard against replay attacks, and a time stamp and message request timeout may be adopted as the limited safeguard against man-in-the-middle attacks. The software also includes protections against eavesdropping such as a utilizing a strong encryption algorithm for one or both of the RF and IR transmissions.

Figure 4:
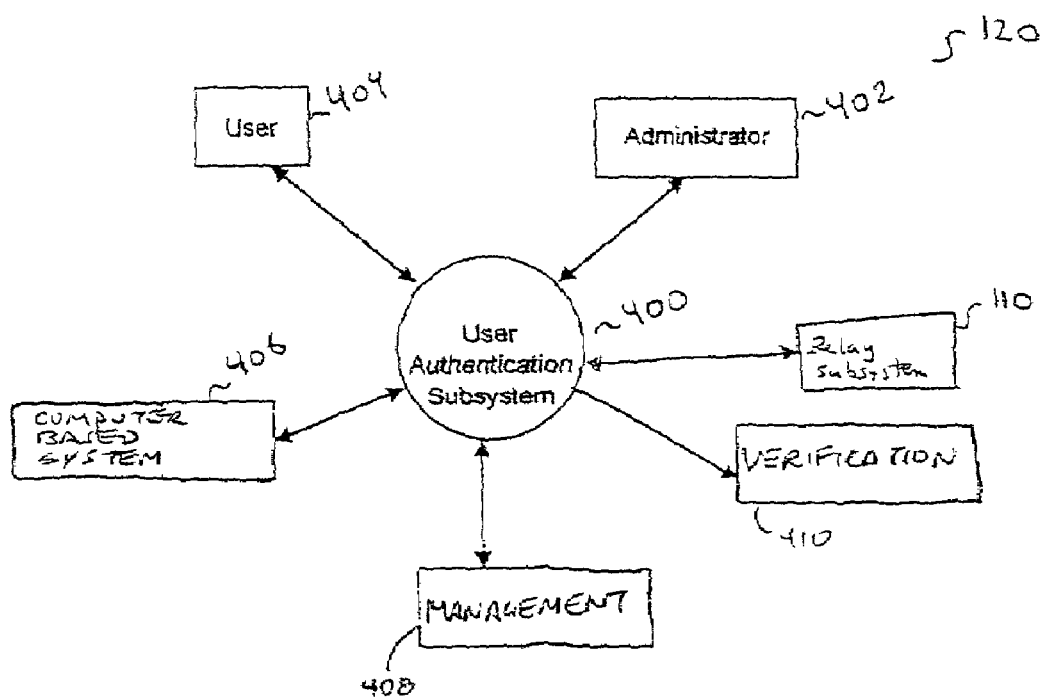
FIG. 4 is a context diagram showing the overall operational environment of the administrator subsystem in accordance with one embodiment of the present invention.

FIGS. 4–19 illustrate the architecture and various features of the administrator subsystem 120 which regulates interfacing operations of the computer-based system with the BARB Badge 100. In FIG. 4, the administrator subsystem 120 manages various system-related tasks such as authenticating a user based on valid user-supplied data, activating a predetermined BARB Badge 100 corresponding to the user, and storing user authentication and identification data on the activated BARB badge. The administrator subsystem 120 further verifies user authentication and identification data received from the BARB Badge 100, and grants the BARB Badge 100 access to the computer-based system in response to the verification. The administrator subsystem 120 manages the foregoing system-related tasks based on predetermined management protocols and the administrative program discussed in conjunction with FIG. 3.

The context diagram of FIG. 4 shows the overall operational environment of the administrator subsystem 120 and identifies external interfaces to the system, both human and other hardware/software elements. As shown, the administrator subsystem 120 includes a user authentication subsystem 400, management subsystem 408, and verification subsystem 410. The administrator subsystem 120 also interfaces with computer-based system 406, BARB Base 110 as well as a system administrator 402 and user 404. Each interface is now briefly described: an administrator 402 is typically the person authorized and responsible for system configuration, security, and user management, a user 404 is typically a person (in a medical care setting) such as a doctor, nurse, or other staff member responsible for providing patient care who needs to access and use the computer-based system 406 in order to perform their job. The computer-based system 406 runs the mission critical application such as a clinical information system in a medical care setting for which the authentication subsystem 400 provides secure access. The verification subsystem 410 provides the public key infrastructure (PKI) upon which the user's access credentials are based, and management subsystem 408 is an enterprise management system, which provides Application Resource Management (ARM), event logging, notifications and the like.

Figure 5:
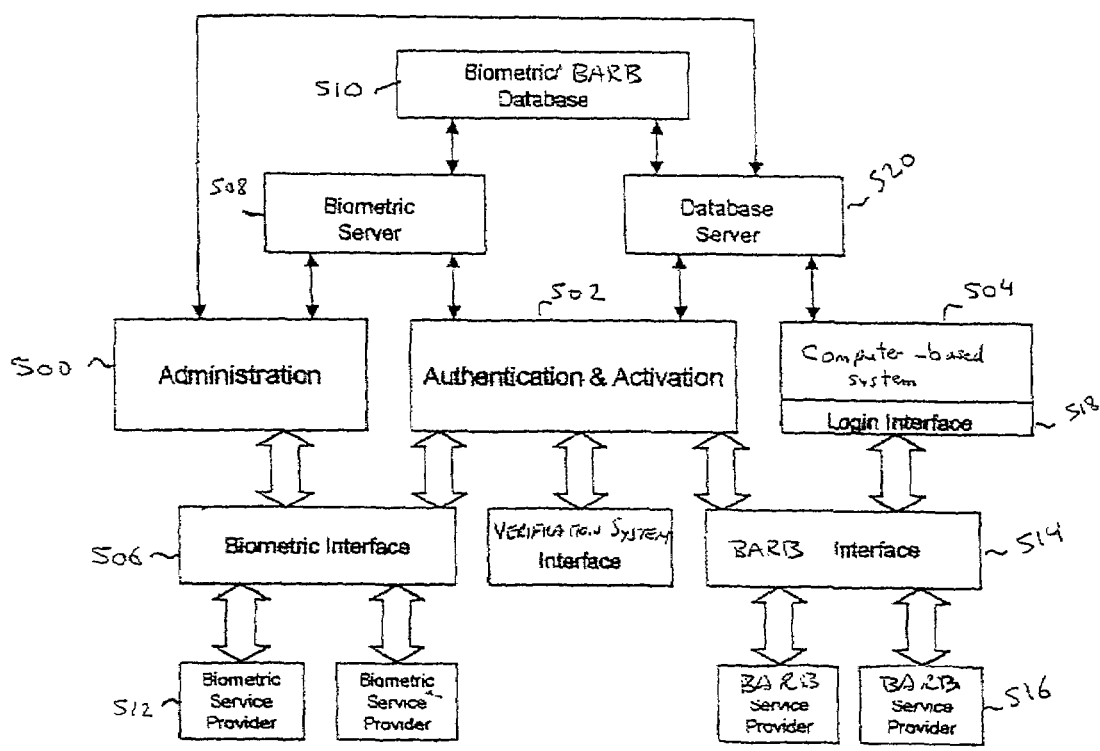
FIG. 5 is a block diagram illustrating the functional architecture of the administrator subsystem in accordance with one embodiment of the present invention.

FIG. 5 is a block diagram illustrating the overall functional architecture of administrator subsystem 120. As shown, functions of administrator subsystem 120 include 1) authentication administration 500, 2) authentication and activation 502 and 3) application login interface 504. For the purpose of brevity, the BARB Badge 100 is abbreviated to "BARB Badge" throughout the figures. Administration of the BARB Badge 100 includes maintaining and managing users' authentication information and authentication methods, including enrollment of biometric characteristics (if used) and management of BARB Badge 100 inventory. Authentication and activation includes the initial authentication of the user at the beginning of a shift (or period of time) and activation of user BARB Badge 100. Application login verifies the identity of users and grants or denies them access to the computer-based system at a given workstation. Additionally, several supporting capabilities are provided for each of the foregoing functions as described in greater detail below.

Figure 6:
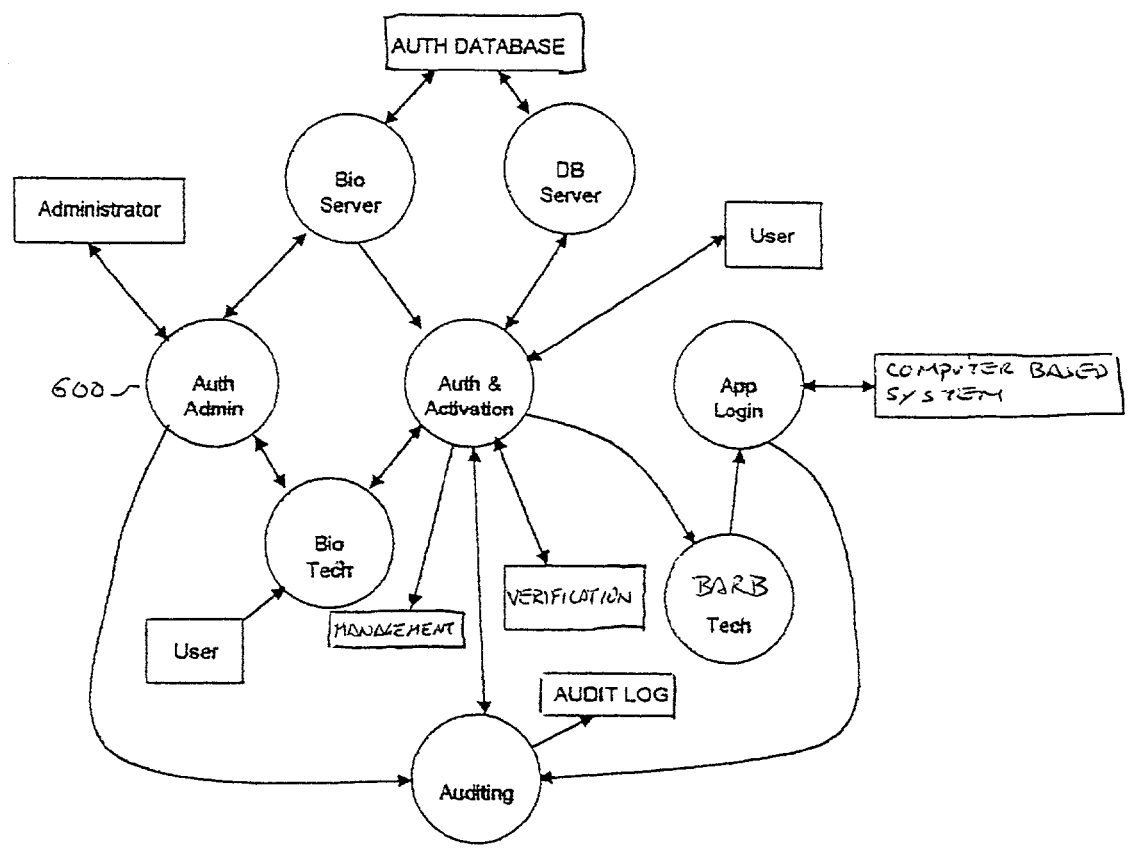
FIG. 6 is a top-level functional data flow diagram for the administrator subsystem in accordance with one embodiment of the present invention.

FIG. 6 illustrates a top-level functional data flow diagram for the administrator subsystem 120. The circular "bubbles" represent system functions, the rectangles represent external elements, the pair of horizontal parallel lines represents data stores, and the arrows represent data (solid) or control (dashed) flow. The label "AUTH DATABASE" refers to both biometric and BARB Badge 100 authentication data.

The functions illustrated in FIG. 5 and FIG. 6 will now be discussed in greater detail in conjunction with the figures and tables presented below.

Figure 7:
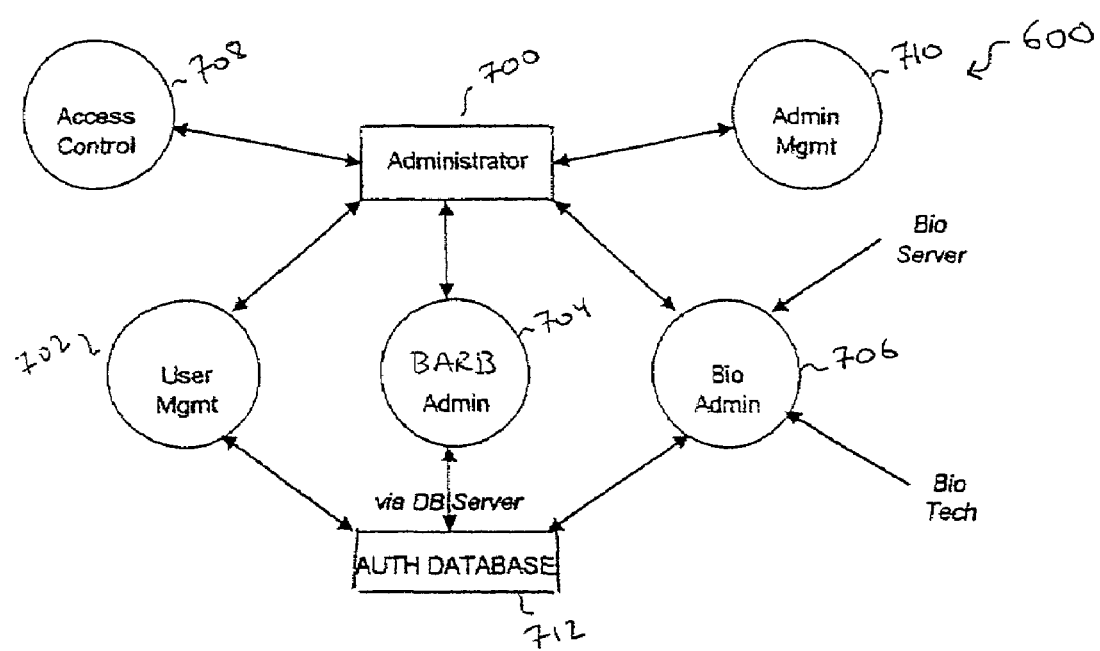
FIG. 7 is a data flow diagram for the authentication administration subsystem in accordance with one embodiment of the present invention.

FIG. 7 illustrates a data flow diagram for the authentication administration subsystem 600 of FIG. 6. As shown, the authentication administration application is one of the separate applications of administrator subsystem 120 and may run on a separate workstation or on the same workstation as the authentication and activation (authentication and activation) application. Authentication administration maintains and manages users' authentication information and authentication methods, including enrollment of biometric characteristics and management of BARB Badge 100 inventory.

Figure 8:
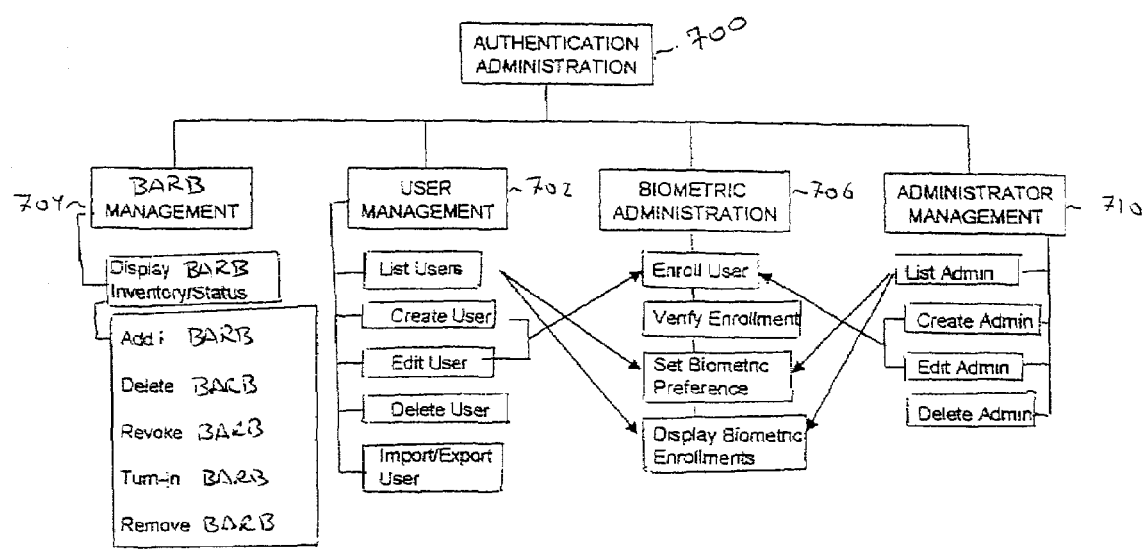
FIG. 8 is an exemplary menu structure for the authentication administration application in accordance with one embodiment of the present invention.

As shown in FIG. 7, authentication administration application 700 includes the following sub-functions of: user management 702, BARB Badge administration 704, biometric administration 706, access control 708, and administrator management 710. In an exemplary embodiment of the invention, each of these functions are accessible from a main or opening display page. Illustrated in FIG. 8, is an exemplary menu structure for the authentication administration application 700 with the arrows illustrating various exemplary cross-relations between elements. The sub-functions illustrated in FIG. 7 and FIG. 8 will now be disclosed in greater detail in conjunction with the following figures.

Figure 9:
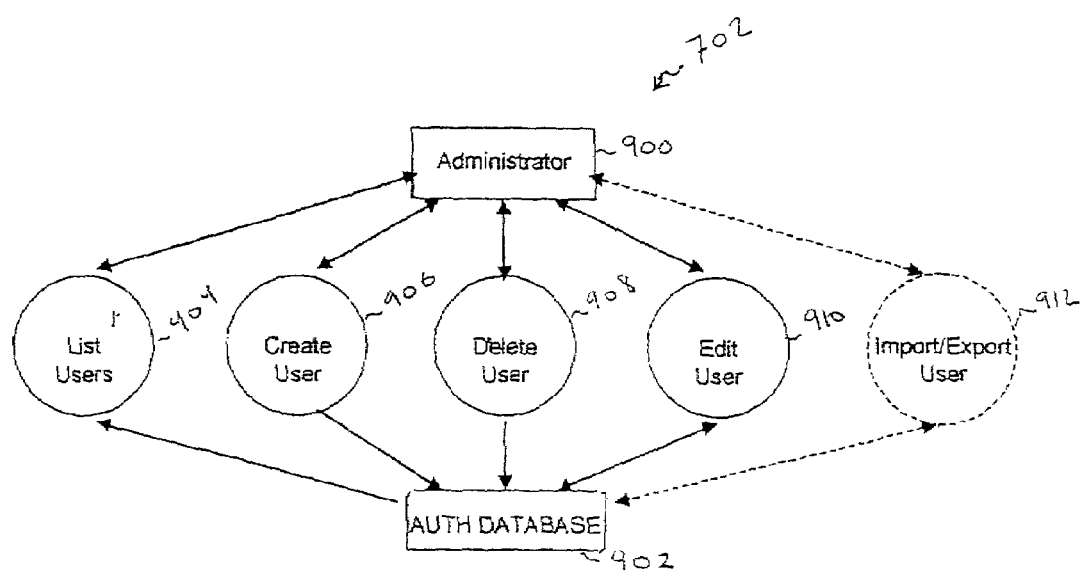
FIG. 9 is a data flow diagram for the user management subsystem in accordance with one embodiment of the present invention.

FIG. 9 is a data flow diagram for the user management subsystem 702. User management includes creation and maintenance of user accounts within the authentication system under the control of the system administrator. In an exemplary embodiment, the user management function is accessed from the main or opening page of the administration application 900 or via a top level menu. As shown, user information is stored in tables within the authentication database 902 (part of the biometric/BARB Badge database). The user management sub-functions include: list users 904, create user 906, delete user 908 and edit user 910. In an exemplary embodiment of the invention, user management also includes a function for user-import and/or export 912. Each of these sub-functions will now be explained in greater detail.

List Users 904 functions as follows: when the "Users" tab is selected, the 'list users' sub-function will display a list of registered system users, along with selected textual information associated with each user, in table format. In an exemplary embodiment, by default the users will be listed in alphabetical order by user-ID. By right-clicking in a different table column, the administrator can re-sort the user list based on the information in that column, alternating between ascending and descending modes. Double-clicking on a single user ID will invoke the Edit User 910 function (see below).

In an exemplary embodiment, an appropriate font size will be utilized in order to display the maximum amount of information that is easily readable. Vertical scrollbars will be provided to allow the administrator to view all users in the table, while horizontal scrollbars will be provided to allow the viewing of all textual information about the users. Selecting another folder tab will close the 'list users' window.

The Create users 906 sub-function allows for addition of new users to the authentication database 902. In an exemplary embodiment, the create users 906 sub-function is invoked via a pushbutton on the "Users" tab. Once invoked, a form will displayed into which the following information is to be entered:

User-ID: A unique string value consisting of up to 30 alpha-numeric characters. The User ID must be consistent with the user's normal logon ID. This is a mandatory entry.

Last Name. The user's last name.

First Name. The user's first name.

Middle Initial. The user's middle initial. Single alpha character. If the user has no middle initial, this field is left blank.

Title. The user's title (such as Dr., Mrs., etc.) (not job position).

Department. The user's department name or number. Up to 30 alphanumeric characters.

Phone Number The user's office phone number. Separate fields will allow the administrator to enter the 3-digit area code, 3-digit exchange, 4-digit phone number, and up to a 5-digit extension.)

Tie Line. The user's 3 character tie line prefix (numeric).

Email Address. The user's email address. Up to 48 text characters.

BARB Badge 100 Time-to-Live. The maximum time the user's BARB Badge 100 will be activated before expiration.

Additionally, from the 'create user' window, the administrator can initiate the 'enroll user' function to enroll the biometrics of that user.

When all user information has been entered, the administrator may select, via a button, to commit the new user information to the database. At this time, a validity check is made of the entered data to ensure that it meets data type and content specifications. The User ID is checked against the user database to ensure that it is unique. If all entered data is valid, the new user record is added to the user table of the authentication database and the "add user" window is closed. The user list will be updated to include the newly added user.

If any data is found to be invalid, the administrator is prompted to correct the entry. At any time prior to selecting OK/Save, the administrator may select to cancel or abort the new user creation process. If selected, a confirmation will be required, such as a message asking "Are you sure?", and if confirmed, any entered information will be discarded and the user information window will then be closed. In an exemplary embodiment, the User ID is verified as valid before committing the transaction.

The Delete User 908 sub-function allows for an authorized administrator 900 to delete users from the authentication database 902. In an exemplary embodiment, the administrator 900 will highlight the user ID in the user list and either-select the 'Delete' button or press the 'Delete' key on the keyboard. If no user ID is highlighted when the 'delete user' function is selected, the administrator will be prompted to select a user ID. When the delete function is activated, the administrator will be asked to confirm, such as by displaying a message asking "Are you sure?", prior to deleting the user from the authentication database. A check will be made to ensure that the user authentication and identified for deletion exists within the database, in case another administrator almost simultaneously deleted that user from another workstation. When a user is deleted, all tables in the database associated with that user ID are deleted, including biometric tables. Once the user has been successfully deleted from the database, the administrator will be notified that the delete has been successfully completed and the user list will be updated to exclude the newly removed user.

Before deleting a user from the database, a check will be made to determine if any outstanding BARB Badges 100 are assigned to that user (i.e., BARB Badge 100 assignment status=assigned). If so, the administrator will be prompted with a list of assigned BARB Badge 100 and given the opportunity to revoke these BARB Badge 100. An entry regarding this action will be made in the audit log.

Edit User 910 sub-function allows for updating of an existing user record. This function will allow the administrator 900 to change any user data except the user ID. In an exemplary embodiment, to activate the 'edit user' function, the administrator 900 may double-click on the user ID in the user list or may highlight the User ID and select the 'Properties' pushbutton. Upon activation, the same form as used for 'create user' will be displayed, with all fields containing the associated user data from the database. The User ID field will not be editable. The administrator 900 may use the mouse, arrow, or tab keys to move from field to field and within fields to modify the contents of that field. From this window, the administrator may also choose to activate the 'enroll user' function to re-enroll (and thus update) the biometric data for that user. When the biometric enrollment is complete, control will return to the 'edit user' window. Once all desired changes have been made to the user record, the administrator may select via the 'Update' button to commit the updated user information to the database, at which time the user information window is closed. If any data is found to be invalid, the administrator 900 is prompted to correct the entry. At any time prior to this, the administrator may select to cancel or abort the 'edit user' process. If selected, a confirmation will be required, such as by displaying a message asking "Are you sure?", and if confirmed, any modified information will be discarded, no changes will be made to the database, and the user information window is then closed. Once the user data has been successfully updated in the database, the administrator will be notified that the update has been successfully completed.

Figure 10:
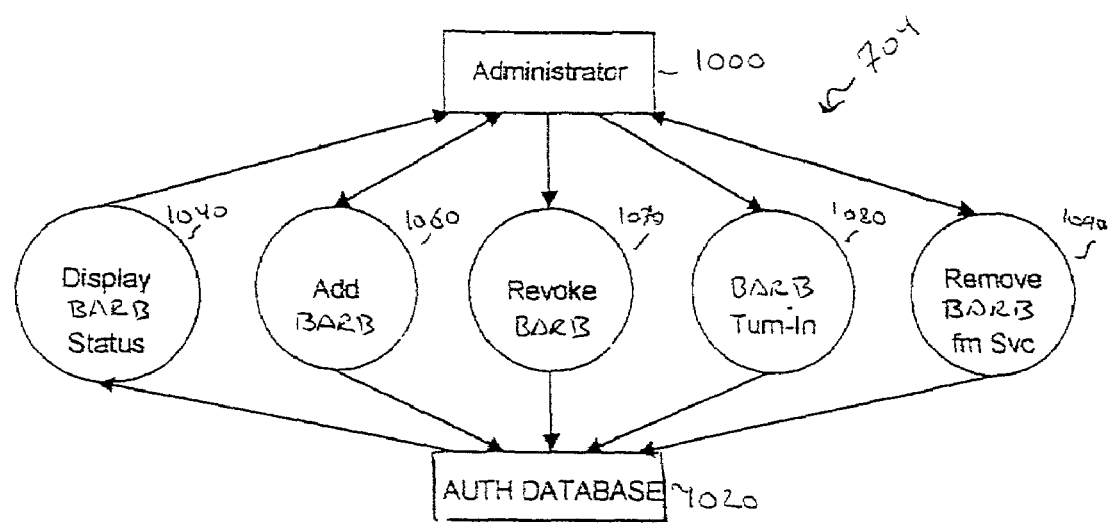
FIG. 10 is a data flow diagram for the BARB Badge administration in accordance with one embodiment of the present invention.

FIG. 10 is a data flow diagram for the BARB Badge administration 704. BARB Badge administration 704 allows for management of BARB Badges 100 inventory. In an exemplary embodiment, the BARB Badge administration 704 functions are accessed from the main or opening page of the administration application or from a top-level menu. Information on a BARB Badge 100 is stored in tables within the authentication database 1020 (part of the biometric/BARB Badge 100 database). The sub-functions of the BARB Badge administration 704 include: Display BARB Badge status 1040, Add BARB Badge 1060, Revoke BARB Badge 1070, BARB Badge turn-in 1080 and Remove BARB Badge from service 1090. Each of these sub-functions will now be explained in greater detail.

Display BARB Badge status 1040 operates as follows. In an exemplary embodiment, when the "Display BARB Badge" tab is selected, the list of all BARB Badges 100 in the inventory, along with current status information about that BARB Badge 100 will be displayed in a table format. By default, BARB Badge 100 will be listed in alphabetical order by BARB Badge 100 ID. By right-clicking in a different table column, the administrator can re-sort the BARB Badge 100 list based on the information in that column, alternating between ascending and descending modes.

In an exemplary embodiment, an appropriate font size will be utilized in order to display the maximum amount of information that is easily readable. Vertical scrollbars will be provided to allow the administrator to view all BARB Badges 100 in the table; horizontal scrollbars will be provided to allow the viewing of all textual information about the BARB Badges 100. Selecting another folder tab will close the 'list BARB Badge 100' window.

Information to be displayed includes the following:
BARB Badge ID. The logical number of the BARB Badge 100 as entered upon creation.
BARB Badge serial number. The manufacturer's serial number of the BARB Badge 100 (generally the number "burned into BARB Badge 100 memory"), entered upon creation.
BARB Badge type. The type of BARB Badge 100 technology (man-readable).
BARB Badge 100 assignment status. Current known status of the BARB Badge 100, either assigned, available, or out of service
BARB Badge 100 activation status. Activated, deactivated, revoked, or inactive.
User ID assigned. User ID of user most recently activating the BARB Badge 100.
Date/time of activation. Date and time of most recent activation.
Date/time of expiration. Date and time of expiration for most recent activation.
Last turn-in time. Date and time that BARB Badge 100 was most recently returned.
Comments. An annotation that the administrator can apply to the BARB Badge 100 such as why the BARB Badge 100 was removed from service. Examples of such an annotation could be: BARB Badge 100 lost by "user name", BARB Badge 100 was returned to vendor for repair, or BARB Badge 100 experienced a hardware failure.

The Add BARB Badge 1060 sub-function allows a BARB Badge 100 to be added to the inventory of BARB Badge 100. In an exemplary embodiment, this function will be invoked via a button on the "Display BARB Badge 100" tab. When selected, a form will be displayed into which the administrator 1000 may enter the following information:
BARB Badge ID. The BARB Badge 100 ID is a logical ID that will be externally assigned and physically attached to the BARB Badge 100.
BARB Badge Serial Number. This will be the manufacturer's serial number of the BARB Badge 100.
BARB Badge Type. The administrator will select one of the available BARB Badge 100 authentication technologies which will be represented by an assigned value.
Comment. An annotation that the administrator can apply to the BARB Badge 100.

Once the data has been entered, the administrator 1000 may select via the "Add BARB Badge 100" button to commit the new BARB Badge 100 information to the database. At this time, a validity check is made of the entered data to ensure that it meets data type and content specifications. Then a check is made of the BARB Badge 100 database to ensure that the entered BARB Badge 100 ID is unique. If all entered data is valid, the BARB Badge 100 information is added to the BARB Badge table of the authentication database 1020 and the "add BARB Badge" window is closed. In addition to the administrator-entered information, the remaining BARB Badge 100 inventory status fields will be initially set as follows:
BARB Badge assignment status. AVAILABLE.
BARB Badge activation status. INACTIVE.
All other fields will remain unset, such as blank.
Add BARB Badge 1060: When the "Add BARB Badge" window closes, the BARB Badge status list will be updated to include the newly added BARB Badge 100.

If any entered data is found to be invalid, the administrator 1000 is prompted to correct the entry. At any time prior to selecting OK/Save, the administrator 1000 may select to cancel or abort the new BARB Badge 100 creation process. If selected, a confirmation ("Are you sure?") will be required and if confirmed, any entered information will be discarded and the 'add BARB Badge 100' window is then closed.

Revoke BARB Badge 1070: The Revoke BARB Badge 1070 sub-function allows the administrator 1000 to "revoke" or invalidate a BARB Badge 100 such as for when a BARB Badge 100 is reported as lost or stolen, or belonging to a terminated employee terminated. In an exemplary embodiment, the administrator 1000 will highlight the BARB Badge ID on the BARB Badge status page and selects the 'Revoke BARB Badge' button from the "BARB Badge" tab. If no BARB Badge ID is highlighted when the revoke function is selected, the administrator 1000 will be prompted to select a BARB Badge ID. When the 'revoke' function is activated, the administrator will be asked to confirm by manually typing the BARB Badge ID of the BARB Badge 100 to be revoked prior to revoking the BARB Badge 100. The administrator 1000 may also make an entry in the comment field during the revocation process. When a BARB Badge 100 is revoked, its activation status is changed to REVOKED in the authentication database 1020, and reflected on the BARB Badge inventory status page.

At any time prior to confirming, the administrator 1000 may select to cancel the BARB Badge revocation process. In an exemplary embodiment, once a BARB Badge 100 has been revoked, it may not be reinstated except through the 'BARB Badge 100 turn in' process.

The BARB Badge Turn In 1080: This sub-function allow for users to turn in their BARB Badge 100 prior to leaving the facility, such as at the end of the day. As BARB Badge 100 are turned in, the BARB Badge administrator will update the status of the BARB Badge 100 in the authorization database 1020. In an exemplary embodiment, the administrator 1000 will highlight the BARB Badge ID on the BARB Badge 100 status page and select the 'Turn in BARB Badge' button from the "BARB Badge" tab. If no BARB Badge ID is highlighted when the turn in function is selected, the administrator will be prompted to select a BARB Badge ID. When the turn in function is activated, a dialog box will appear for the administrator to manually type in the BARB Badge ID for confirmation, then select 'OK'. Once confirmed, the status of the BARB Badge 100 will be changed in the authentication database 1020 and reflected on the BARB Badge inventory status page, as follows:

BARB Badge assignment status. Change to AVAILABLE.
BARB Badge activation status. Change to INACTIVE.
Last turn in time. Change to current date and time.

The administrator 1000 will also be provided with the opportunity to make an entry in the comment field during the BARB Badge turn in process. The administrator 1000 may select 'CANCEL' to abort the BARB Badge turn in operation prior to confirmation. In an exemplary embodiment, this function is also used to reinstate a revoked BARB Badge 100 or to return a BARB Badge 100 to service that was previously removed.

The Remove BARB Badge from Service 1090: This sub-function function allows the administrator 1000 to logically remove a BARB Badge 100 from inventory. In an exemplary embodiment, the administrator 1000 will highlight the BARB Badge ID on the BARB Badge 100 status page and select the "Remove BARB Badge" button from the "BARB Badge" tab. If no BARB Badge ID is highlighted when the 'remove BARB Badge from service' function is selected, the administrator will be prompted to select a BARB Badge ID. When this function is activated, the administrator 1000 will be asked to confirm by manually typing the BARB Badge ID number prior to removing the BARB Badge 100 from service by updating the BARB Badge 100 tables in the authentication database. The administrator 1000 is then given the opportunity to update the comment field. When a BARB Badge 100 is removed, its status will be changed as follows:

BARB Badge assignment status. Change to REMOVED FROM SERVICE.
BARB Badge activation status. Change to INACTIVE.
Last turn in time. Change to current date/time.

Once the BARB Badge 100 has been successfully removed, the BARB Badge 100 inventory status list will be updated.

Figure 11:
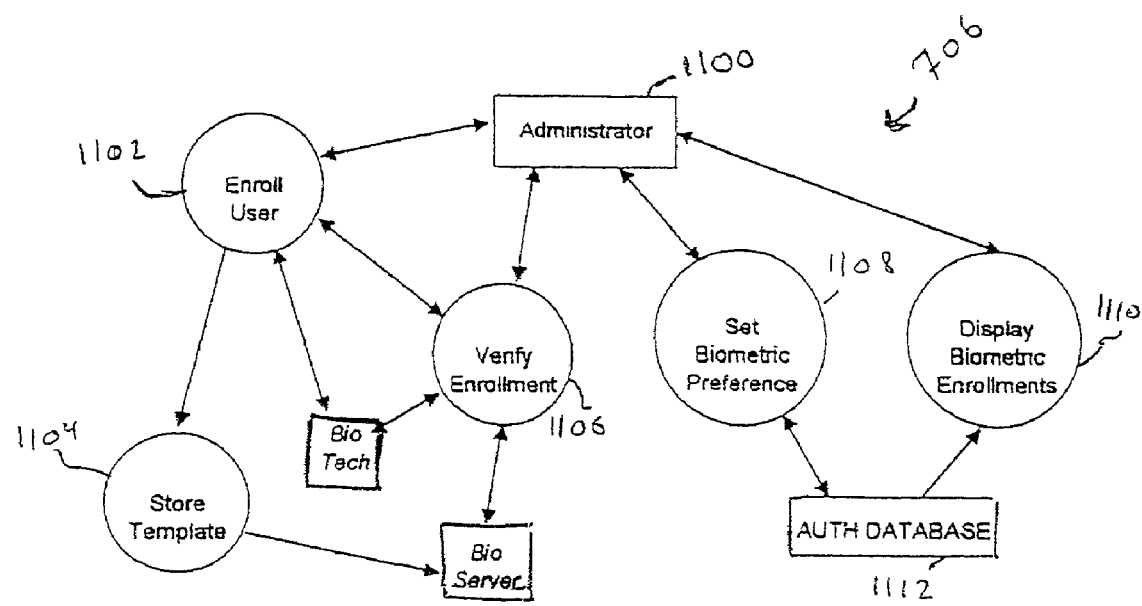
FIG. 11 is a data flow diagram for the biometric administration subsystem in accordance with one embodiment of the present invention.
Figure 12:
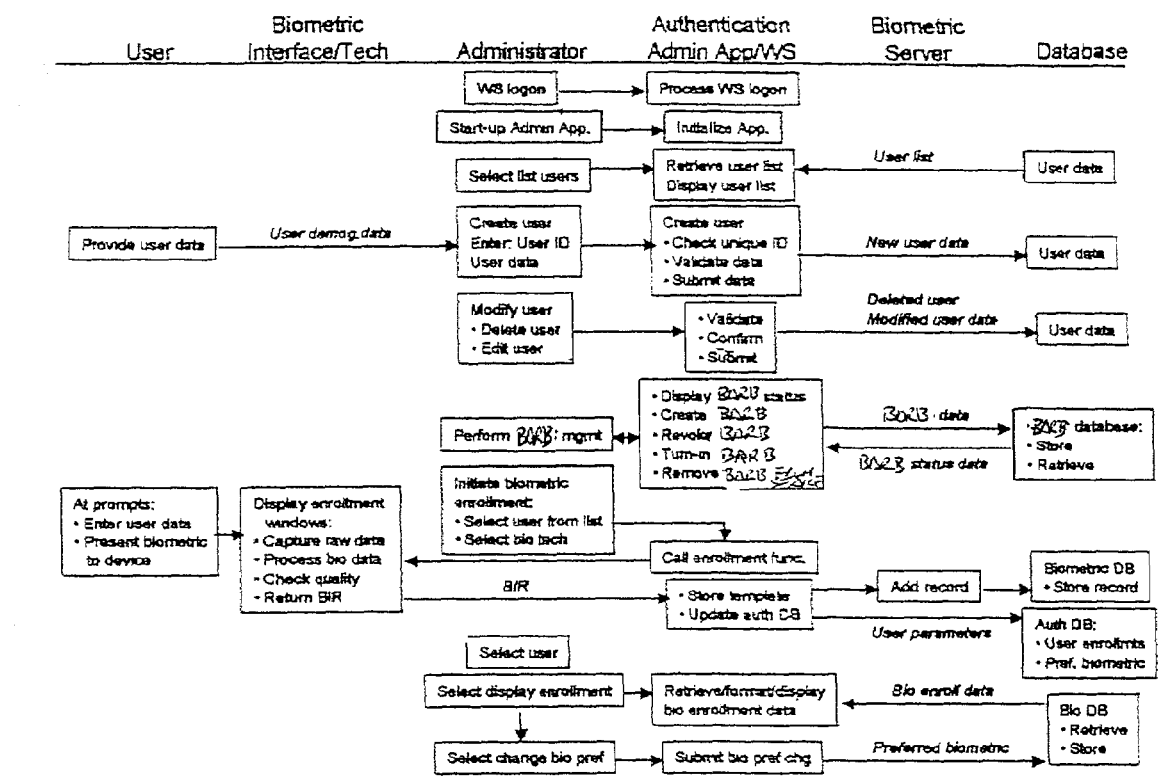
FIG. 12 is an operational sequence diagram of the overall operations of authentication administration subsystem in accordance with one embodiment of the present invention.

FIG. 11 is a data flow diagram for biometric administration 706. Biometric administration 706 allows for enrollment of users' biometric data into the system. In an exemplary embodiment, biometric information is stored in tables within the authentication database 112 as part of the biometric/BARB Badge database. In an exemplary embodiment, the biometric administration 706 sub-functions are accessed from a menu button on the user/administrator property page. The biometric administration 706 sub-functions include: Enroll user 1102, Store template 1104, Verify biometric enrollment 1106, Set biometric preference 1108 and Display biometric enrollments 1110. These sub-functions will now be explained in greater detail.

The Enroll user 1102 sub-function allows for a user's biometric information to be captured and processed for storage and future matching. In an exemplary embodiment, the Enroll user 1102 sub-function is activated from the 'Create Admin', 'Edit Admin', 'Create User' or 'Edit User' functions, by highlighting the user ID on the user/admin list and selecting the 'Properties' button, then the 'Enroll' button.

Upon selection, the administrator 1100 will be provided with a choice of biometrics to be enrolled from those that are available (i.e., installed on the system). The administrator 1100 may also select one biometric at a time in which to enroll a given user. Upon selection, the application will invoke the enrollment function of the selected biometric technology via an appropriate interface such as HA-API (Human Authentication API) or BioAPI. This will result in the return of the biometric identifier record (BIR), also known as a template, or a cancellation (e.g., enrollment function failed or was cancelled by user).

If a valid BIR is received, it will be sent (along with the User ID) to the Store Template function. If a cancellation is received, the screen will return to the initial biometric enrollment/select biometric window. The administrator 1100 may then enroll the user in another biometric, if desired, or exit the function.

The Store Template 1104 sub-function allows for a received valid BIR and user ID information from the 'enroll user' function, to be packaged for submission to the Biometric Server. In an exemplary embodiment, this will be accomplished via the client interface component of the Biometric Server, which resides on the workstation. Client/server secure communications will be via a secure RPC channel using existing OS utilities/services. The Store Template 1104 sub-function will then update the user record within the authentication database to indicate that the user has been enrolled in the particular biometric technology. This is tracked by the BUID number of the biometric API BSP. If no other biometrics have thus far been enrolled, the currently stored biometric will also be entered as the preferred biometric.

The Set Biometric Preference 1108 sub-function operates once the Biometric Enrollment dialog is displayed for the current user ID or admin ID. The administrator 1100 can change the biometric preference by selecting a biometric method from the list box and hitting the "Set Preference" button. The user/admin must have already been enrolled via the selected method, as indicated by a check mark. If no check marked method is highlighted when the 'Set Preference' function is selected, the administrator will be prompted to select a method. Otherwise, the selected method will be displayed in the preferred biometric field below the user/admin ID. At any time prior to selecting OK/Save, the administrator may select to cancel or abort the biometric enrollment process. If selected, a confirmation ("Are you sure?") will be required and if confirmed, any entered information will be discarded and the 'biometric enrollment' window will then be closed.

The Display Biometric Enrollments 1110 sub-function displays, for a given user, the biometrics in which the user has been enrolled along with the preferred biometric. This function will be invoked when the administrator selects the 'Enroll' button from the User/Administrator properties page. From this window, the administrator will also be able to invoke the Enroll User 1102 and Set Biometric Preference 1108 sub-functions. When the list of biometric enrollments is displayed, the preferred biometric will be indicated (either by a separate listing or via highlighting). Any enrolled biometrics for which the matching technology is not installed on the admin workstation will be grayed out to indicate non-availability for re-enrollment at that station. If other available biometric technologies are listed (to enable selection for enrollment), then the enrolled biometrics will be distinguished from un-enrolled biometrics by a check mark or other clear indicator.

The Verify Biometric Enrollment 1106 sub-function allows the administrator 1100 to select to verify a user biometric enrollment. In an exemplary embodiment, the administrator 1100 may select from the Display Biometrics window any enrolled, available technology from the biometrics list and invoke the Verify Biometric Enrollment function by pressing the "Verify" button. Upon activation the selected biometric technology will be activated to perform a local biometric capture and processing operation, followed by a server verify operation. The results of the verify will be displayed (i.e., Match or No Match). The administrator 1100 may then choose to close this window and return to the Display Biometrics window. The Verify Biometric Enrollment 1106 sub-function allows for the administrator 1100 to check the quality of a biometric enrollment to ensure the template is matched by the user immediately following the enrollment process while the user is still available; however, the function may also be used at other times such as for if the user has been experiencing trouble authenticating at the authentication and activation station with a particular biometric technology.

Administrator management 710 is another function provided by authentication administration application 700. Administrators are those individuals authorized to access the Authentication Administration application and perform the above functions. Functions must be available to manage the list of authorized administrators and their associated data.

The Administrator management 710 function includes substantially the same functions as those user management 702 and also uses the biometric enrollment and display biometric enrollment functions described above. The only differences are that no biometric preference is associated with an administrator (they may log-in with any enrolled/installed biometric), no import/export function exists, and there is an additional password capability associated with administrators.

Access control 708 is another function provided by authentication administration application 700. Access control 708 controls access to the authentication administration application. Upon launch and initialization of Access control 708, the administrator will be asked to biometrically authenticate themselves before the access to administrative functions are granted.

In an exemplary embodiment, the administrator's 1100 access may be restricted to the "Login" Tab and menu help functions. On the "Login" dialog, the administrator 1100 will type their authentication and identifier into the 'Admin ID' field in the "Login" tab window, may enter the backup password into the password field, and will select the "Login" button (or depress the ENTER button). If the Admin ID does not match to any stored IDs in the database, the administrator will be informed of such and the fields are cleared for further attempts. If the Admin ID is found and no password was typed in, then the application will invoke the verification function of the selected biometric technology via the biometric interface. If the acquired biometric matches the stored biometric, the administrator will be informed of the match and will be granted access to the other areas of the dialog. If a password was provided, then it will be checked against the backup password currently assigned to that Admin ID. If they match, the administrator will be informed of the match and will be granted access to the other areas of the dialog.

In an exemplary embodiment, a logout function allows one administrator 1100 to logout so that another administrator 1100 can log in without closing the program. When an administrator 1100 selects the "Logout" button, the application will prompt a "Are you sure you want to logout?" message. If the administrator 1100 selects "Yes", then the "BARB Badge 100", "Users", and "Admins" tabs will be locked down; an asterisk is added to the tab as a reminder.

The overall operational process flow and operations of an exemplary embodiment of authentication administration subsystem in accordance with FIGS. 5–11 as described above are summarily illustrated in FIG. 12. It should be noted that this operational sequence diagram is not intended to convey a detailed design or use case scenario, but to depict the general process flow. In the diagram, the columns depict system components. Events, activities, or processes are shown within rectangular boxes. Decisions are shown as diamonds. Data or control flows are shown as arrows. The sequence in time is read downwards from top to bottom.

Authentication and activation 502 as introduced in FIG. 5 is another function of administrator subsystem 120. Authentication verifies a user's identity at the beginning of each shift, prior to BARB Badge 100 activation. Activation uploads the user's authentication credentials to the BARB Badge 100 and activates the BARB Badge 100 for some preset amount of time.

Figure 13:
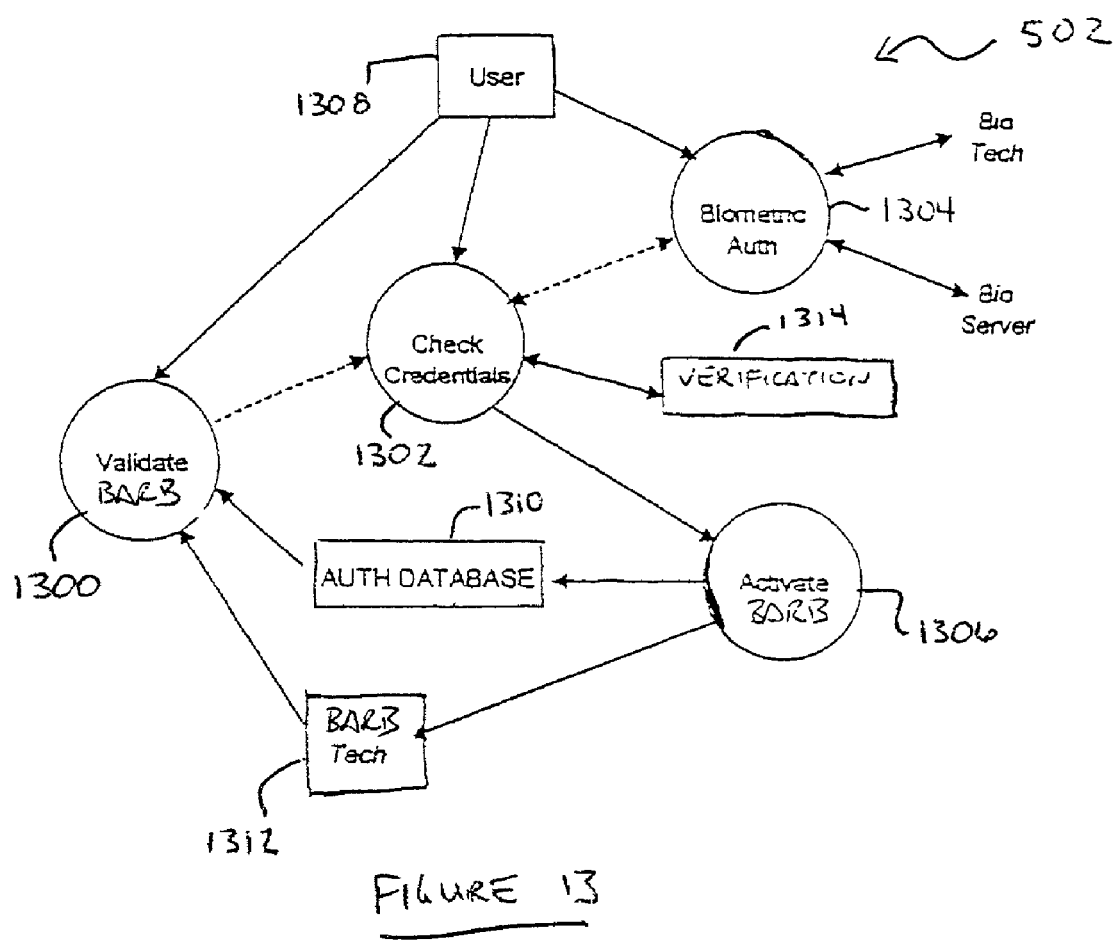
FIG. 13 is a data diagram for the authentication and activation application in accordance with one embodiment of the present invention.

FIG. 13 is a data diagram for the authentication and activation application 502 which includes the following sub-functions allowing the user 1308 to Validate BARB Badge 1300, Check credentials 1302, Biometric authentication 1304, Activate BARB Badge 1306 and authentication and activation authentication and activation application utilities 1308.

In an exemplary embodiment, prior to approaching the authentication and activation station, the user 1308 is required to have picked up an inactive BARB Badge 100 from the inventory of BARB Badges 100. This BARB Badge 100 must be present in order to be activated. When the authentication and activation application 502 is initiated, a main display screen will be presented. Along with available options that include:

Activate BARB Badge 100 (default)

Options

Activate BARB Badge 100 with password change

Deactivate BARB Badge 100

In an exemplary embodiment, when the application is first initialized, it will retrieve from the Key Holder (ancillary function), the crypto key for encrypting/decrypting BARB Badge 100 data. Upon initialization, and thereafter, the BARB Badge 100 technology function will (unsolicited) provide a BARB Badge 100 state table consisting of a list of BARB Badge ID numbers that the BARB Base has detected (via RF, IR or both) as well as the status of each, to the authentication and activation function. This table will be refreshed each time a change in state occurs such as when a BARB Badge 100 is detected, is no longer present or has changed in its status. In an exemplary embodiment, the authentication and activation application 502 may run on a separate workstation or on the same workstation as the authentication administration application 500.

Each of the sub-functions of the authentication administration application 500 will now be explained in greater detail. The Validate BARB Badge 1300 will prompt the user to enter in appropriate fields the logical number of the BARB Badge 100 to be activated, the user ID, and the password. In an exemplary embodiment, Validate BARB Badge 1300 sub-function is initiated upon completion of program initialization (i.e., upon launch) and the entry stage is accomplished via a pop-up window on a graphical user interface application. The user then enters data into all fields, then press 'OK' or the "Enter/Return" key when done. In an exemplary embodiment a 'Tab' key can move the cursor between fields, or the mouse may be used to position the cursor. To increase password security, the BARB Badge number and User ID will be displayed as typed. If at any time during the BARB Badge 100 activation process the process is discontinued for any reason, then the entered password data will be purged from memory.

Upon receipt of the entries, the Validate BARB Badge 1300 will query the authentication database 1310 to: 1) ascertain if the entered logical BARB Badge 100 ID exists and display an error message if it does not, and 2) retrieve the manufacturer serial number associated with the entered logical BARB Badge 100 ID from the Authentication/BARB Badge 100 database.

The Validate BARB Badge 1300 will then retrieve the current state table of the BARB Badge 100 to see if the serial ID number for the entered BARB Badge 100 is present via the BARB Badge 100 Technology function 1312.

In an exemplary embodiment, the query returns the serial numbers for either one BARB Badge 100, multiple BARB Badges 100, or no BARB Badge 100. If no serial numbers are returned, the user 1308 will be prompted to position the BARB Badge 100 for proper reading and the BARB Badge 100 query will be retried. After a preset timeout period, the user 1308 will be prompted to return the BARB Badge 100 to the administrator and check out another BARB Badge 100 and the application will return to the main screen which clears all entries, and purges the entered password from memory. If upon repositioning, a serial number is returned, then processing will continue according to the following approach:

If only one serial number is returned, then the authentication database will be queried for the status of that BARB Badge 100. A check will be made to verify that the logical BARB Badge 100 number entered matches the number retrieved from the inventory. If not, or if the logical BARB Badge 100 number does not exist in the inventory, the user will be asked to re-enter the logical BARB Badge 100 number. If a match is now found, then the processing will proceed. Otherwise, the above sequence of events will be repeated until the user has entered up to 3 logical serial numbers without success. At this point, the application will display an error message such as asking the user to return this BARB Badge 100 to the BARB Badge 100 return area and select another, and return to and clear the main screen.

If multiple serial numbers are returned, then the authentication and activation application will query the authentication database 1310 for the status of the logical BARB Badge 100 number entered by the user 1308. If the serial number returned from the inventory database matches one of the serial numbers present, then it will be assumed that this is the BARB Badge 100 to be activated and processing will proceed. If the returned serial number does not match any of the serial numbers present, or if the logical BARB Badge 100 number does not exist in the inventory, the user will be asked to reenter the logical BARB Badge 100 number, which will then be queried for status from the inventory and matched against serial numbers present. This will be repeated until the user has entered up to 3 logical serial numbers without success, at which point the user will be prompted to return the BARB Badge 100 to the administrator and check out another BARB Badge 100. The application will return to and clears the main screen.

Next, the BARB Badge 100 assignment status field is checked. If this field reflects 'available', then processing will continue. If the BARB Badge 100 status is one of "assigned" or "out of service", the user will be prompted to return this BARB Badge 100 to the administrator and select another, and the application will then return to the main screen.

Next, the BARB Badge activation status field is checked. If this field reflects 'inactive', then processing will continue. If the BARB Badge 100 activation status is one of 'activated' or 'deactivated', then this indicates an unreturned BARB Badge 100. In this case, the user will be prompted to return the BARB Badge 100 to the administrator and check out another BARB Badge 100. If the BARB Badge 100 activation status is 'revoked', then the user will be prompted to return the BARB Badge 100 to the administrator and check out another BARB Badge 100.

Next, the BARB Badge 100 will be queried for its status such as via the BARB Badge 100 technology function 1312. The authentication and activation function will query the user's BARB Badge 100 with the serial number matching the logical serial number entered for its status. If enabled, it will check battery status to determine that the battery is adequately charged (i.e., exceeds minimum value). If so, processing will continue. If not, the user will be prompted to return the BARB Badge 100 to the BARB Badge 100 return area and select another, with the application returning to and clearing the main screen.

Finally, a battery check is conducted after which a check will be made to determine if the BARB Badge 100 is ready for activation. This involves determining if the BARB Badge 100 is located on the user's person and if the ID BARB Badge 100 is inserted (by checking the BARB Badge 100 state table). A Check Table file is first checked to determine which BARB Badge 100 checks are enabled. Then the status bits are checked. Table 1 below provides a delineation of the actions to be taken depending on these factors.

TABLE 1

BARB Badge 100 Ready Check Table

| ENABLED? | On-person | | T | | | | T | | | | F | | | | F | | |
|---|---|---|---|---|---|---|---|---|---|---|---|---|---|---|---|---|---|
| | ID | | T | | | | F | | | | T | | | | F | | |
| VALID? | On-person | 1 | 1 | 0 | 0 | 1 | 1 | 0 | 0 | 1 | 1 | 0 | 0 | 1 | 1 | 0 | 0 |
| | ID | 1 | 0 | 1 | 0 | 1 | 0 | 1 | 0 | 1 | 0 | 1 | 0 | 1 | 0 | 1 | 0 |
| ACTION | | A | B | C | D | A | A | C | C | A | B | A | B | A | A | A | A |

A = Processing continues
B = User is prompted to insert ID into badge; ID checks continue until good or timeout
C = User is prompted to attach badge to person; On-person checks continue until good or timeout
D = User is prompted to insert ID into badge and attach badge to person; checks continue until both values are good.

As shown in Table 1, if a check is enabled (T), but the associated value is found to be invalid (0), the user will be prompted to take the appropriate action to correct the condition. The faulty indicator will be continuously checked until the status changes to 'yes' (1) or until a preset 'BARB Badge 100 check timeout' period has expired. After the timeout expires, the user will be prompted to return the BARB Badge 100 to the administrator and check out another and the application will return to the main screen.

If the BARB Badge 100 successfully passes all of the foregoing validation checks, then control will pass to the Check Credentials sub-function 1302 as described below.

Figure 14A:
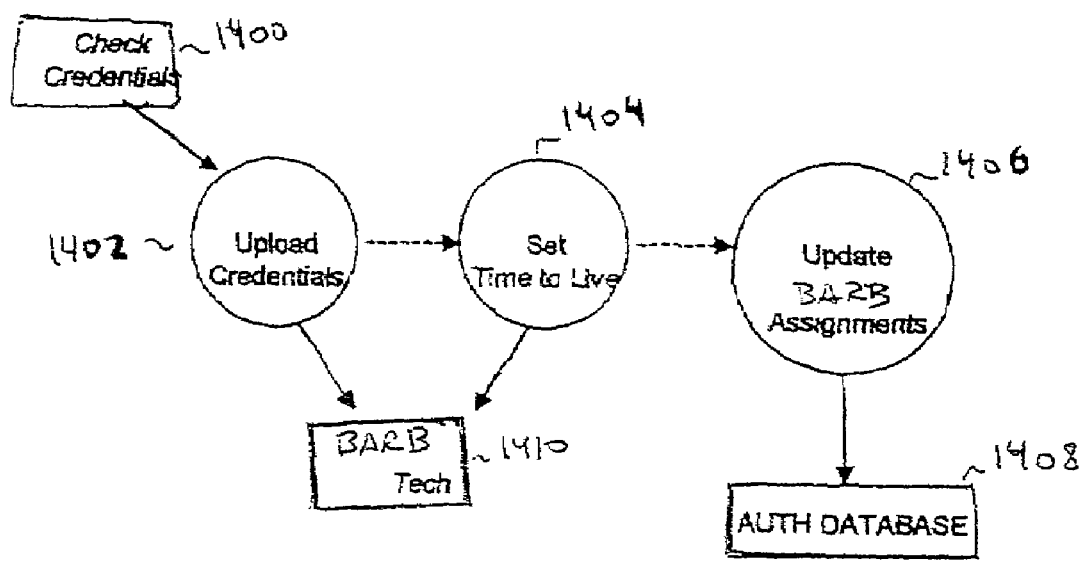
FIG. 14A is a data flow diagram for Activate BARB Badge function in accordance with one embodiment of the present invention.
Figure 14B:
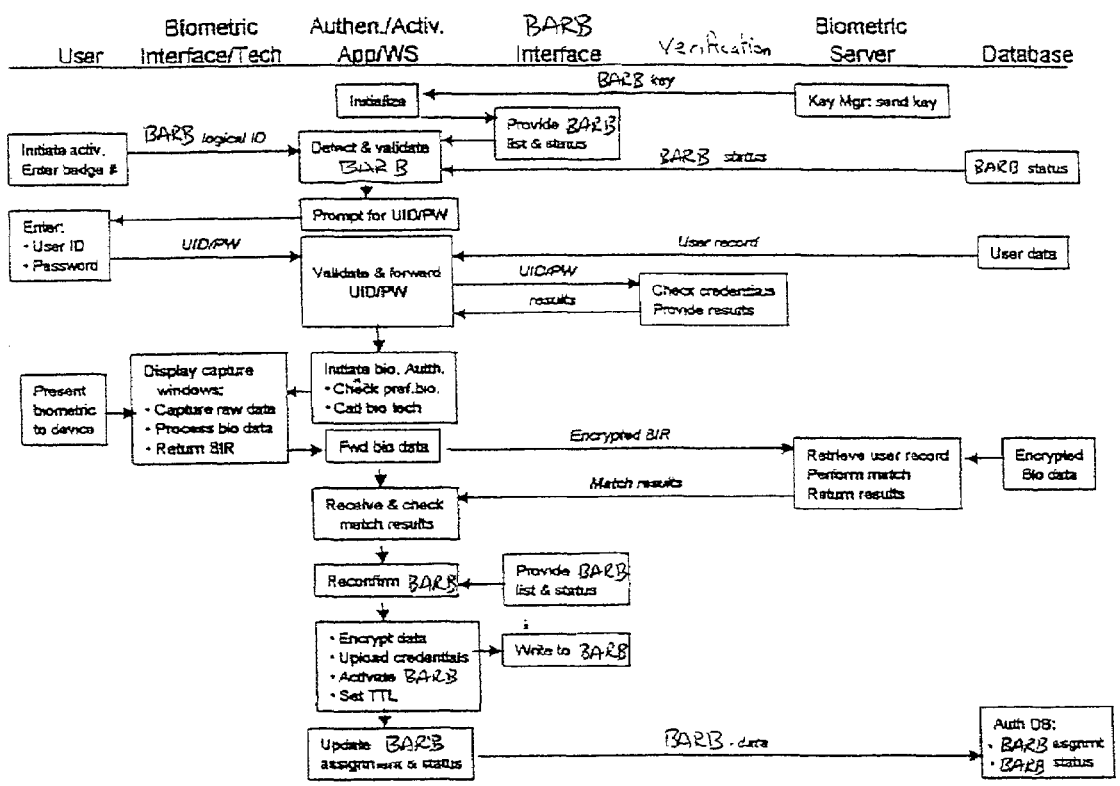
FIG. 14B is an operational sequence diagram of the overall operations of authentication and activation subsystem in accordance with one embodiment of the present invention.

FIG. 14A is a data flow diagram for Activate BARB Badge function.

As shown, first, at Check Credential at block 1400, the status of the BARB Badge 100 is re-checked to ensure that the BARB Badge 100 is ready for activation. In an exemplary embodiment, this information is obtained by querying the BARB Badge Technology interface 1410 for the serial number of interest. Upon receipt of the BARB Badge status information, the following will be checked to see whether 1) BARB Badge 100 is still present or 2) BARB Badge 100 is 'on-person'. If check is enabled, the INI file (shown in Tables 14A–C infra) setting for specific BARB Badge 100 technology) and 3) the picture ID is inserted (if check is enabled, INI file (shown in Tables 14A–C infra) setting for specific BARB Badge 100 technology).

If the BARB Badge 100 is not present, the user will be prompted to position the BARB Badge 100 for writing, and the BARB Badge 100 query will be retried. After a preset timeout period (see INI file shown in Tables 14A–C infra), the user will be prompted to return the BARB Badge 100 to the administrator and check out another BARB Badge 100 and the application will return to the main screen (clearing all entries). If, upon repositioning, presence of a BARB Badge 100 is detected, then the 'on-person' and ID badge fields will be checked in the same manner as described above. Once all of the foregoing three conditions are met, the Upload Credentials 1402 sub-function will be activated.

The Upload Credentials 1402 sub-function operates as follows: when the BARB Badge 100 has been confirmed as 'ready to write,' a BARB Badge write will be issued to the BARB Badge Technology interface 1410. Three actions will be performed: 1) reset BARB Badge, 2) initialize BARB Badge, and 3) write user credentials. First, the BARB Badge 100 will be reset, which should bring it to some known, initial (power-up) state. This involves Resetting 'on-person confidence' to 100%, Resetting 'ID ever removed' to No/False and Setting broadcast back-off interval (number of interval units). Second, the BARB Badge 100 will be initialized. This will include setting of the global password. Third, the following user credentials will be encrypted (using the encryption key obtained from the key holder during start-up) and written to the BARB Badge 100 via the BARB Badge 100 interface, which handles the security associated with the BARB Badge 100:

User ID: tag="UID", data=annnnnn, password=global PW

User password: tag="UPW", data=up to 16 alphanumeric characters, password=global PW In an exemplary embodiment, the user data is encrypted before writing to the BARB Badge 100.

In addition to the user's credentials, two other writes to the BARB Badge 100 are also performed for setting of time-to-live and the activating of the BARB Badge 100. Both are accomplished by the Set Time-to-Live/Activate BARB Badge 1404 sub-function.

In an exemplary embodiment, the time-to-live value is associated with a specific user and will have previously been retrieved with the user record from the authentication database. This value will be written to the BARB Badge 100, via the BARB Badge Technology BARB Badge 1410, such as by issuing the following instruction:

Time-to-live: tag="TTL", data=nn (hours), password=global PW

It should be noted that depending on technology, this data may require conversion into an expiration date/time group and may be done in terms of a command rather than a data field.

Once all pertinent data has been successfully written to the BARB Badge 100, the BARB Badge 100 is set to active. Once activated, all user credentials will be purged from memory.

The Update BARB Badge 1406 sub-function, upon successful BARB Badge 100 activation, displays a message to the user showing:

An "Activation Successful" message, User name, User ID, Logical BARB Badge 100 number, and Expiration date and time. In addition, BARB Badge 100 status in the authentication database is updated as follows:

BARB Badge 100 ID. No change (not writable by this application)

BARB Badge 100 serial number. No change (not writable by this application)

BARB Badge 100 assignment status. ASSIGNED

BARB Badge 100 activation status. ACTIVE

User ID assigned. USER ID

Date/time of activation. ACTIVATION DTG

Date/time of expiration. EXPIRATION DTG

Last turn-in time. No change (not writable by this application)

In addition to the BARB Badge activation functions described above, other administrative utility functions are also included as described below. In an exemplary embodiment, these administrative utility functions are accessible from the authentication and activation option window and include: Deactivate BARB Badge 100, and Exit application. These functions will now be explained in greater detail.

Deactivate BARB Badge allows for a user that for various reasons may need to deactivate a previously activated BARB Badge 100 prior to its programmed time-to-live. To do this, the user will initiate the 'deactivate BARB Badge function on the authentication and activation workstation. Once initiated, this function will prompt the user to enter the logical BARB Badge number of the BARB Badge 100 to be deactivated. The application will then query the status of this BARB Badge 100 using the BARB Badge Technology Interface 1410. The application will also query the assignment status of the BARB Badge 100 from the authentication database. Once the data pertinent to the BARB Badge has been assembled, the application will make the following checks:

BARB Badge 100 presence. Is the BARB Badge 100 to be deactivated currently present?

BARB Badge 100 activation status. Is the status of the BARB Badge 100 currently active, with an unexpired time-to-live?

BARB Badge 100 assignment status. Is the BARB Badge 100 currently assigned?

If the BARB Badge 100 is present, then the serial number reported by the BARB Badge 100 will be compared against the BARB Badge serial number obtained from the database 1408. If there is a match, then the processing will continue. If no match is found, then the user will be asked, for up to a fixed number of times, e.g., three, to reenter the logical BARB Badge 100 number. If no match occurs by in any of these tries, then the user will be notified of the failure and the application will return to the main screen.

In an exemplary embodiment, if the BARB Badge 100 is present, active, and the serial numbers match, the title and name for the assigned User ID will be retrieved and a message displayed to the user as follows:

Example: "Hello Dr. Jones. Are you sure you want to deactivate BARB Badge 100 number XX?"

'Yes' and 'No' options will be provided. If 'No' is selected, the application will return to the main screen. If 'Yes' is selected, the application will write to the BARB Badge 100 as follows:

BARB Badge 100 will be reset.

BARB Badge 100 activation will be set to false.

All user data on the BARB Badge 100 will be erased.

Then, the BARB Badge 100 activation status in the authentication database 1408 will be changed to DEACTIVATED. The user will then be notified that the BARB Badge 100 has been deactivated and that the BARB Badge 100 should be returned to the BARB Badge 100 return area or the system administrator. If the BARB Badge 100 is not present, the user will be prompted to position the BARB Badge 100 for writing, and the BARB Badge 100 query will be retried. After a preset timeout period (see INI file in Tables 14A–C infra), the user will be prompted that the BARB Badge 100 deactivation failed and to return it to the administrator. If upon repositioning, BARB Badge 100 presence is detected, then deactivation will continue as described above. If the BARB Badge 100 is present, but inactive, the application will notify the user that the BARB Badge 100 is already deactivated. The application will then return to the main screen.

Upon selecting "Exit Application" from the authentication and activation Options window, a dialog box will be displayed asking "Are you sure you want to exit?" 'Yes' and 'No' options will be provided. If 'No' is selected, the application will return to the options menu. If 'Yes' is selected, the application will be gracefully shut down.

The overall operational process flow and operations of an exemplary embodiment of the authentication and activation subsystem in accordance with FIGS. 12–14A as described above are summarily shown in FIG. 14B. It should be noted that this operational sequence diagrams is not intended to convey a detailed design or use case scenario, but to depict the general process flow. In the diagram, the columns depict system components. Events, activities, or processes are shown within rectangular boxes. Decisions are shown as diamonds. Data or control flows are shown as arrows. The sequence in time is read downwards from top to bottom.

Application login interface 504 as introduced in FIG. 5 is another function of administrator subsystem 120. Application login interface 504 verifies the identity of users and grants or denies them access to the computer-based information application at a given workstation. In an exemplary embodiment, the Application login interface 504 is executed on each computer-based networked workstation. Login occurs using the wireless token, but does not preclude manual login to the computer-based system Client application via entry of User ID and password. As shown in the data flow diagram of FIG. 15A, the Application login interface 504 includes the following sub-functions: 1) maintain login state 1500, 2) get BARB Badge info 1502, 3) query BARB Badge status 1504, 4) proxy credentials 1506, and 5) password update 1508. Each sub-function will now be explained in greater detail.

The Maintain Login State 1500 sub-function maintains a dynamic state table, to keep track of the state of the login process. In an exemplary embodiment, the maintained login states of are: 1) ready for login state, 2) busy state: when the user is currently logged on, and 3) wait state.

The system is considered ready for login following such notification from the client. At this point, BARB Badge login is enabled. If a BARB Badge 100 is recognized during this state, a BARB Badge login will be attempted. A user is considered to be logged on when the client notifies the login enhancement of a positive login result, whether that login was initiated by the login enhancement or was accomplished manually. This state is analogous to a "busy" state. While any user is logged on to the client, no other user may be logged on to the same client, regardless of a BARB Badge 100 detection. This function will maintain the currently logged on user by User ID in a table.

The system is considered to be in a "wait" state under the following conditions:

A syntax check has been received, but no login result or 'logon screen up' notification has yet been received.

A negative login result has been received, but no 'logon screen up' notification has yet been received.

A 'logoff/lockup' notification has been received, but no 'logon screen up' notification has yet been received.

A BARB Badge 100 login has been sent to the calling application, but results have not yet been returned.

A system shutdown notice has been received, but the login application has not yet shutdown.

When the system is in the 'wait' state, no BARB Badge logins may be attempted; however, the login application tracks the BARB Badges 100 that become present during the wait state, and the order in which they appeared so that the first appearing BARB Badge 100 still present may be logged on once the state changes to ready for login. This represents the login candidate list.

This function also maintains a table as to the recently logged off users (by User ID/BARB Badge 100 number). Once logged off, a delay period is initiated during which time that user may not be logged back in to avoid inadvertent login immediately following the logout, but before the user can leave the room. Once the delay ("BARB Badge 100 cloaking") time has run out, the user is removed from the "no login list" and may be logged in. The BARB Badge 100 cloaking delay period is set in the INI file (shown in Tables 14A–C infra).

A table is kept of recently failed BARB Badge 100 logins. After a BARB Badge 100 login failure (either due to syntax or credentials) is reported by the Proxy Credentials function, that User ID is added to the "no login list", so that the individual whose BARB Badge 100 failed to properly log him in will not be precluded from manually logging in. The user will remain on the "no login list" until he is determined to have left the room (i.e., BARB Badge 100 is no longer present). In accordance with one embodiment of the present invention, failed manual logins will not be tracked as these are handled directly by the computer-based system.

The Get BARB Badge Info 1502 sub-function is invoked when the presence of a BARB Badge 100 is recognized. The BARB Badge Technology interface 1514 will send a BARB Badge state report to the login enhancement as an update to the BARB Badge state table. If the system is in a 'ready for login' state, then the first arriving BARB Badge 100 that is a) still present and b) not on the "no login list", will become the login candidate. The Get BARB Badge Info 1502 sub-function will then query the login candidate BARB Badge 100 for its status and login credentials. In response to this query, the BARB Badge 100 interface returns information including the BARB Badge 100 serial number and status, User ID, Password, and Time to live.

In an exemplary embodiment, the login enhancement decrypts the user data (user ID and password) using the encryption key obtained from the key holder during startup. Then the BARB Badge 100 is checked to ensure that it is acceptable for logon purposes. To be acceptable, the BARB Badge 100 must meet the following criteria:

Time to live/activation indicator. UNEXPIRED (DTG is later than current time)/ACTIVATED On person indicator (if enabled). ON PERSON Probability of removal (if enabled). ≧Minimum Confidence (set in the INI file shown in see Tables 14A–C infra)

ID inserted indicator (if enabled). INSERTED

ID removal indicator (if enabled). NEVER REMOVED

If any of the above criteria are not met, then the BARB Badge 100 will be added to the 'no login list' until departing the area. The next BARB Badge 100 on the login candidate list (if any) will then be selected and this function is repeated for that user. If the above criteria are met, the BARB Badge 100 information is then passed to the Query BARB Badge Status 1504 sub-function described below.

The Query BARB Badge Status 1504 sub-function, upon receipt of candidate BARB Badge 100 data, queries the authentication database 1516 to determine the status of this BARB Badge 100. If the BARB Badge 100 is found to be invalid, then it will be added to the 'no login list' until departing the area. The next BARB Badge 100 on the login candidate list (if any) will then be selected and the 'Get BARB Badge 100 Info' function will be invoked. If the BARB Badge 100 is found to be valid (BARB Badge 100 assignment status=assigned and BARB Badge 100 activation, then the user's credentials (User ID and Password) will be passed to the Proxy Credentials 1506 sub-function described below.

The Proxy Credentials 1506 sub-function, upon validation of the BARB Badge 100 and receipt of credentials, will interface to the Client to pass these credentials to initiate a BARB Badge 100 login to the computer-based system. This will follow the interface definition for the Client login modifications. Once the login request has been made, this function will notify the Maintain Login State function 1500, so that the state can be changed to 'wait'. The Client will respond with the following returns of 1) Syntax check result and 2) Login result.

The syntax check should be positive since it is an automated interface, unless an error in transmission has occurred. If a negative syntax check is received, the BARB Badge 100 will be added to the 'no login list to avoid the "three times and you're out" feature and to allow for a manual login. If the syntax check is positive, the system continues to wait for the login result.

Upon receipt of the login result, if the result is positive, then the login enhancement Maintain Login State 1500 sub-function will be notified so that the state may be changed to 'busy' and the logged on User ID can be posted. If a negative result is received, then the Maintain Login State 1500 sub-function will also be notified, so that the BARB Badge 100 can be added to the 'no login list' to allow for a manual enrollment. This might occur if a password change occurred subsequent to BARB Badge 100 activation, so the BARB Badge 100 contains old credentials. If so, the Password Update 1508 sub-function described below will be invoked.

The Password Update 1508 sub-function allows for system to recover from a condition of a failed automatic BARB Badge 100 login, other than for syntax reasons, such as when a password change occurred subsequent to BARB Badge 100 activation. If after an attempted automatic BARB Badge 100 login, notification is received from Computer-based system 1510 of a login failure and an immediate (time defined in INI file, shown in Tables 14-C, infra) notification is received from Computer-based system 1510 of a successful (manual) login, then: If User ID for the failed BARB Badge 100 login and the successful manual login are the same, and the Password for the failed BARB Badge 100 login and the successful manual login are different, then it is assumed that a password change has occurred and the new (successful manual) password will be written to the BARB Badge 100.

In an exemplary embodiment, the BARB Badge 100 must be detected to be present by checking the BARB Badge state table. If the BARB Badge 100 is not present, this function will not be performed. If the BARB Badge 100 is present, then the new password will be uploaded to the BARB Badge 100 as described above.

Figure 15A:
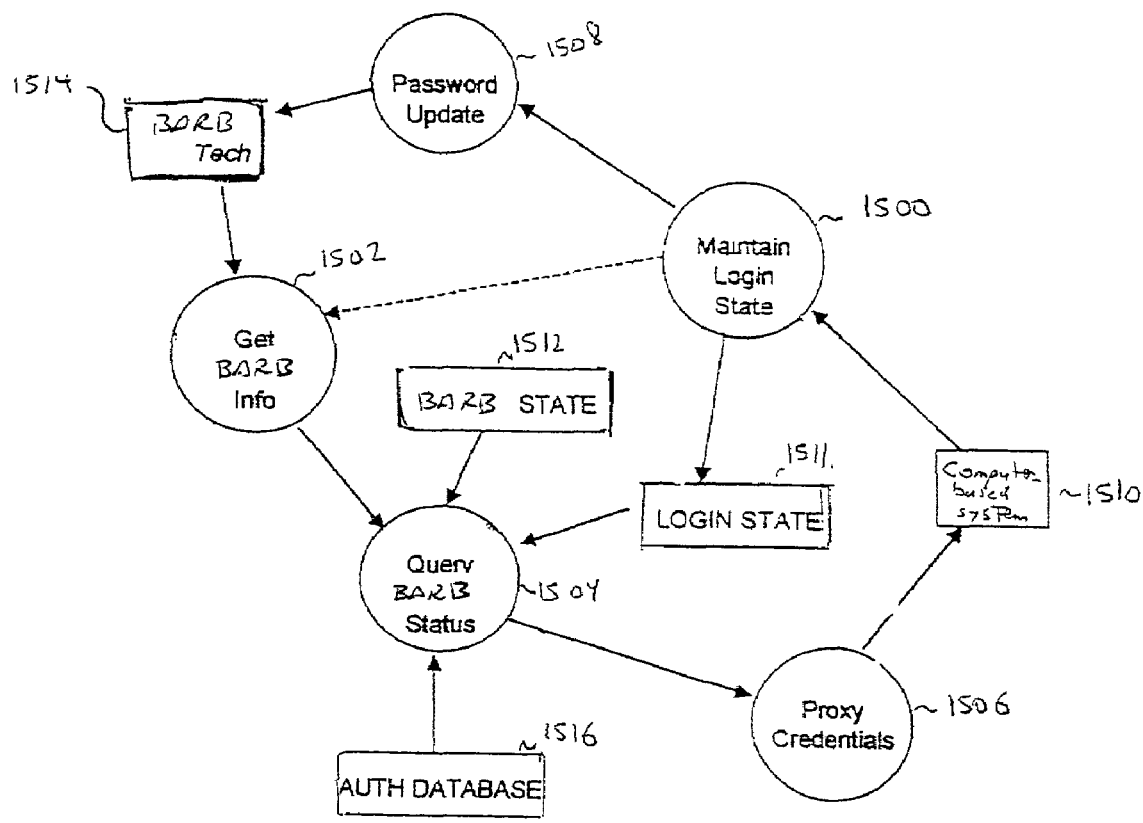
FIG. 15A is a data flow diagram for Login Application interface function in accordance with one embodiment of the present invention.
Figure 15B:
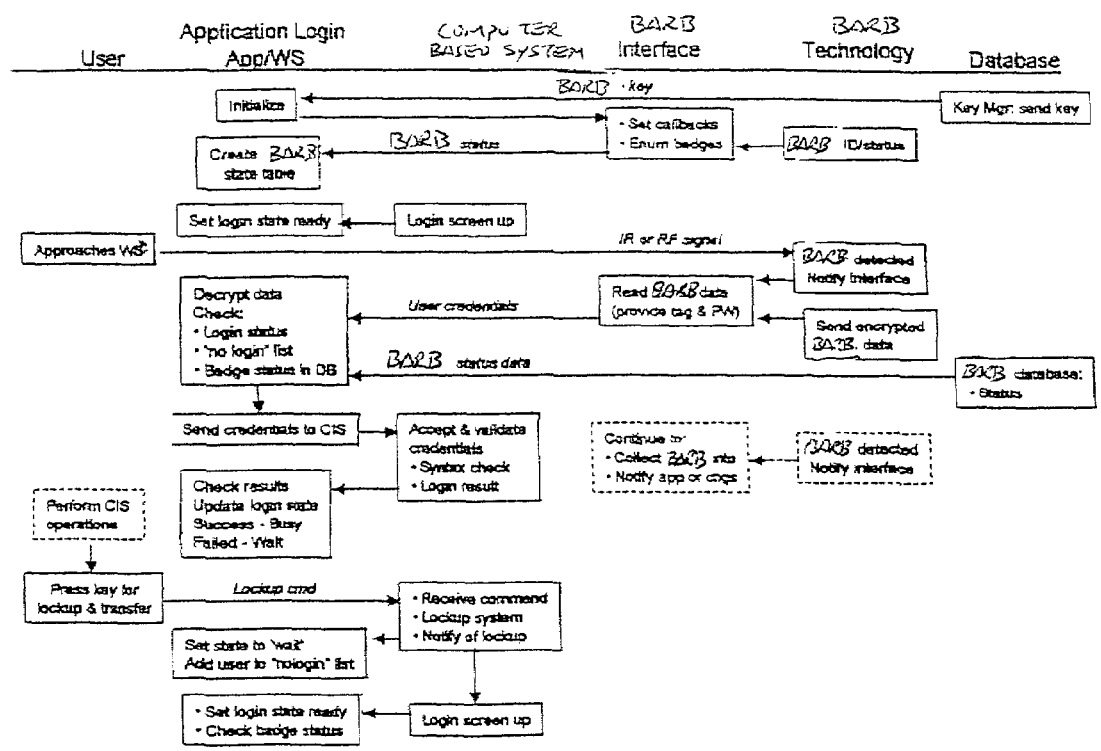
FIG. 15B is an operational sequence diagram of the overall operations of login application interface in accordance with one embodiment of the present invention.

The overall operational process flow and operations of an exemplary embodiment of the login application interface in accordance to FIG. 15A as described above are summarily shown in FIG. 15B. It should be noted that this operational sequence diagrams is not intended to convey a detailed design or use case scenario, but to depict the general process flow. In the diagram, the columns depict system components. Events, activities, or processes are shown within rectangular boxes. Decisions are shown as diamonds. Data or control flows are shown as arrows. The sequence in time is read downwards from top to bottom.

Figure 16:
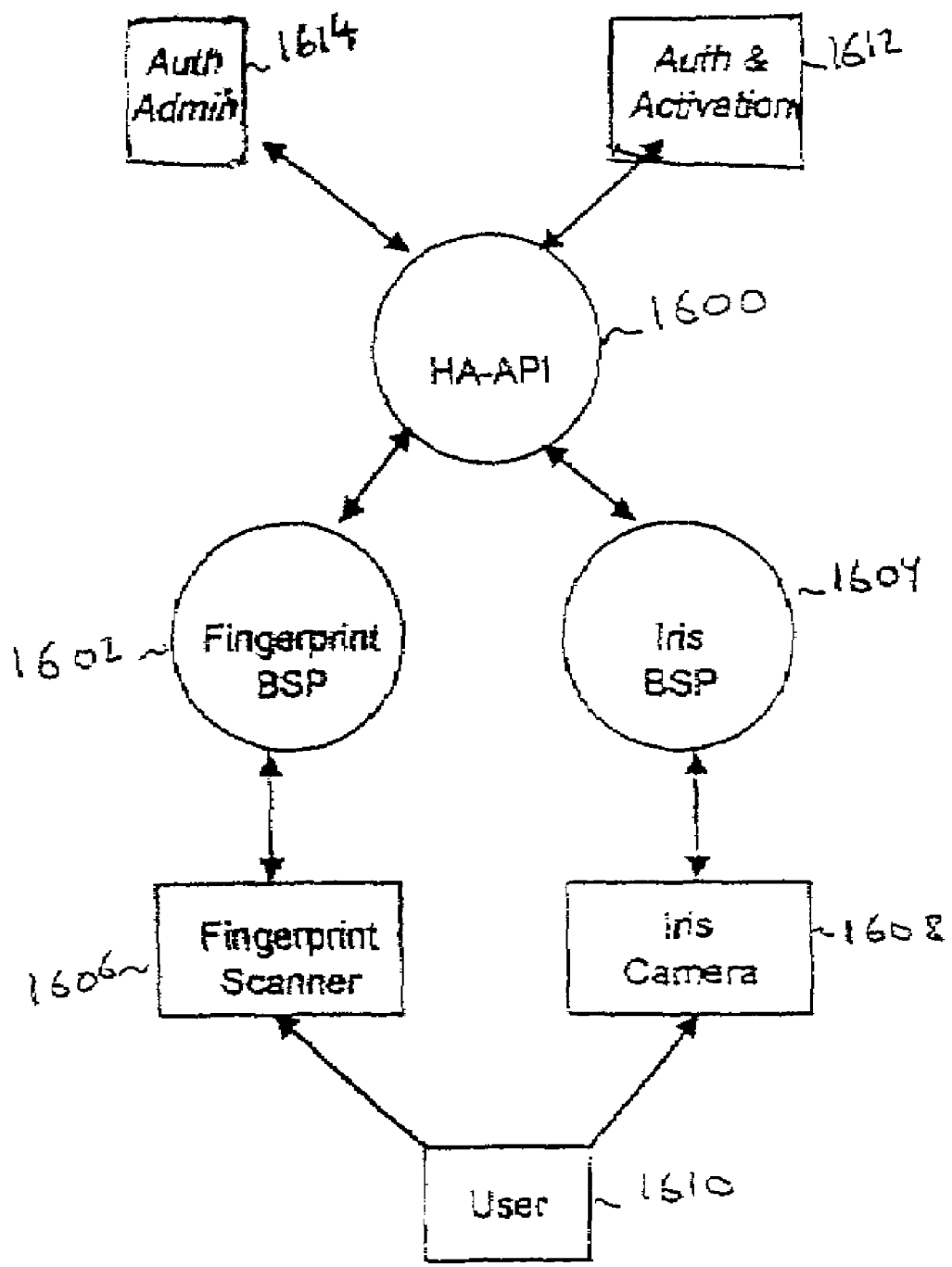
FIG. 16 is a functional flow diagram for the biometrics operations of the administrator subsystem in accordance with one embodiment of the present invention.

Returning to FIG. 5, the administrator subsystem includes biometric functions and components accessed by the administration 500 and the authentication & activation 502 functions. As shown, these biometrics include biometric interface 506, biometric server 508, biometric database 510 and a number of biometric service providers (BSP) 512. In an exemplary embodiment, these biometric interfaces, modules, and devices are commercial-off-the-shelf (COTS) components and are commonly available from a number of vendors. FIG. 16 is a functional flow diagram for the biometrics operations of the administrator subsystem. As shown, the biometric operations include the following sub-functions: Biometric authentication API (such as HA-API or BioAPI) interface 1600, 2) Fingerprint BSP 1602 and 3) Iris BSP 1604. Each of these sub-functions are now explained in greater detail.

In an exemplary embodiment, the biometric interface 1600 sub-function is the methodology by which the biometric devices are accessed. The system is designed in such a fashion to allow various biometric API's such as HA-API, BioAPI or future APIs to be utilized. Biometric runtime software will be included as a COTS component and will communicate directly with and manage any compliant BSPs installed in the system.

In the Fingerprint BSP 1602, a Biometric Service Provider (BSP) module packages the biometric algorithms needed to perform a biometric capture, process, verify, and enrollment. In an exemplary embodiment, the BSP interfaces directly with a biometric capture device such as the fingerprint scanner 1606 and the user 1610 to perform the requested operation. Any graphical user interface required to perform these operations is performed by the BSP.

The Iris BSP 1602 sub-function also performs the biometric capture, process, verify, and enrollment upon request.

It interfaces directly to a biometric capture device such as the iris scanning camera 1608, and to the user 1610. Any graphical user interface required to perform these operations is performed by the BSP.

Figure 17:
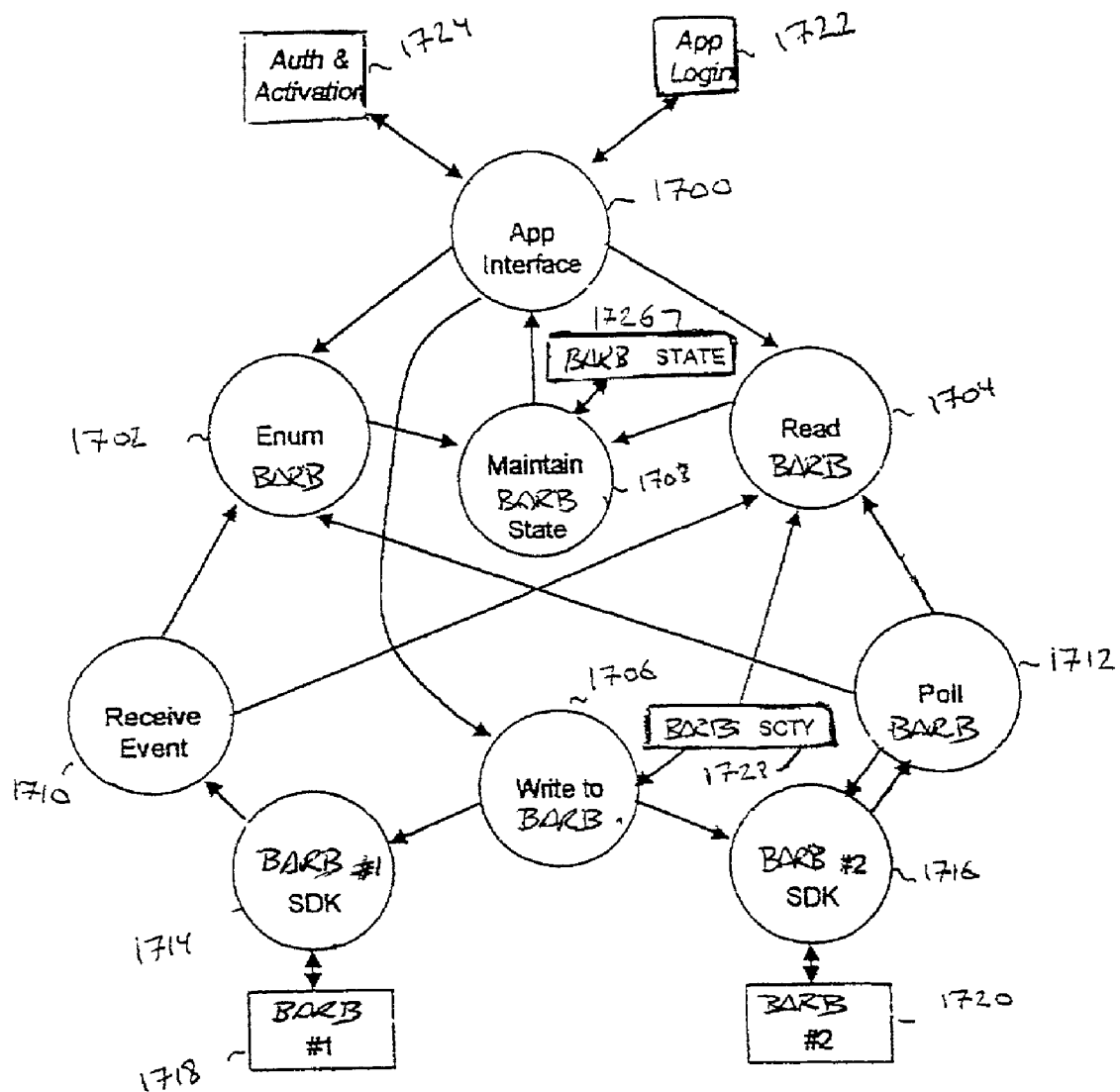
FIG. 17 is a functional flow diagram for the BARB Badge operations of the administrator subsystem in accordance with one embodiment of the present invention.

Also shown in FIG. 5, the administrator subsystem includes functions and components for the BARB Badge 100 accessed by the login interface application 518 and the authentication & activation 502 functions. As shown, these include BARB Badge interface 514, BARB Badge database 510 and a number of BARB Badge service providers (PSP) 516. In an exemplary embodiment, the biometric interface, module, and devices are commercial-off-the-shelf (COTS) components or can be of other designs. FIG. 17 is a functional flow diagram for the BARB Badge operations of the administrator subsystem. As shown, the BARB Badge operations include the following sub-functions:

Application interface 1700, 2) Enumerate BARB Badge 1702, 3) Read BARB Badge 1704, 4) Write to BARB Badge 1706, 5) Maintain BARB Badge state 1708, 6) Receive event 1710 and 7) Poll BARB Badge 1712. Each of these sub-function are now explained in greater detail.

The Application Interface 1700 sub-function provides a standard interface for the application to interface to a wireless token. In an exemplary embodiment, two or more such tokens are to be supported and the interface to the application is designed to be the same in all cases. Table 2 below provides a list that includes functions available for the application interface 1700 in an exemplary embodiment.

occurs, either due to the arrival/departure of a BARB Badge 100 or change in status of a BARB Badge 100. In addition, the BARB Badge 100 time-to-live is set at the time the BARB Badge 100 is activated, as opposed to as an explicit data write operation.

The Enumerate BARB Badge 1702 sub-function determines what BARB Badge 100 are present in the vicinity of the workstation. A list of BARB Badges 100, by BARB Badge 100 number are returned to the application as a result of this sub-function, such as in descending order of appearance time (first appearing to last appearing). In an exemplary embodiment, this data will be received from the BARB Badge software in three ways depending upon BARB Badge architecture: (a) BARB Badge 100 is polled by BARB Badge service provider for the information, (b) BARB Badge 100 may automatically beacon its presence, or (c) BARB Badge 100 BARB Base 110 may provide polling functionality in either firmware or hardware.

The Enumerate BARB Badge 1702 sub-function also sends BARB Badge 100 information to the Maintain BARB Badge State sub-function 1708 to maintain a state table of all BARB Badges 100 present and retrieves a current state when needed.

In an exemplary embodiment, a "flicker filter" is used to determine the continuous presence of a BARB Badge 100, with the goal of minimizing brief periods where BARB Badge 100 presence cannot be detected but the user is still in the immediate vicinity, such as when the user moves behind an obstruction, turns away, or bends down out of

TABLE 2

| Function | Information passed in | Information returned |
| --- | --- | --- |
| Initialize interface | Callback data | BARB BADGE state table (all BARB BADGE) |
| [Callback] | [Receiver] | Event data |
| Enumerate BARB BADGE | Request | BARB BADGE state table (all BARB BADGE) |
| Ping BARB BADGE | BARB BADGE serial number | Success or failure |
| Request BARB BADGE status | BARB BADGE serial number | BARB BADGE status (specific BARB BADGE) |
| Reset BARB BADGE | BARB BADGE serial number | Success or failure |
| Initialize BARB BADGE | BARB BADGE serial number, global password, | Success or failure |
| Write BARB BADGE data | BARB BADGE serial number, User ID, password | Success or failure |
| Delete BARB BADGE data | BARB BADGE serial number, tag/password or global password (delete all) | Success or failure |
| Read BARB BADGE data | BARB BADGE serial number, tag, password | BARB BADGE data (User ID, password, time-to-live) |
| Activate data pre-read | Data tags | Success or failure |
| Request expiration time | BARB BADGE serial number, global password | Expiration DTG |
| Activate BARB BADGE | BARB BADGE serial number, time-to-live, global password | Success or failure |
| Get/Set BARB BADGE parameters | BARB BADGE power (BARB BADGE serial #)<br>Base sensitivity<br>Visible timeout<br>Lost BARB BADGE timeout | BARB BADGE power<br>Base sensitivity<br>Visible timeout<br>Lost BARB BADGE timeout |
| Get/Set on-BARB BADGE features | BARB BADGE serial number-<br>Indicator status<br>Playtone<br>Playwave<br>Clock<br>Date | Indicator status<br>Clock<br>Date |

In an exemplary embodiment, the application interface 1700 sub-function will use the callback to send data to the BARB Badge state table whenever a change to the Table 2 view of the transceiver etc. A default filter delay time is set (in the INI file, shown in Tables 14A–C infra), and checked for value. If the period of non-detection is less than this delay time, the user is still considered present and their lack of detection during that period is not reported to the application. If the period of non-detection exceeds the flicker time delay, then the user is considered to have left the vicinity and is removed from the state table. If the user then reappears, he is re-added to the bottom of the state table. Thus, a delay timer is set/reset for each user depending on consecutive detection intervals. In an exemplary embodiment, the default flicker filter is set to 3 seconds.

The Read BARB Badge 1704 sub-function queries the BARB Badge 100 to return data stored on-board the BARB Badge 100. In an exemplary embodiment, the data on a BARB Badge 100 is stored in the following format:

Data tag. The identifying tag number associated with the specific data element.

Data. The stored data element content.

Data password. The required password to access the stored data element.

A list of data contents to be stored on the BARB Badge 100 in an exemplary embodiment is shown in Table 3:

TABLE 3

| Data Tag | Data Element | Description | Format |
|---|---|---|---|
| UID | User ID | User ID of the use to which the BARB BADGE has been assigned as a result of a successful activation. | Annnnnn |
| UPW | User Password | Password of the user to which the BARB BADGE has been assigned after a successful activation. | 8–16 alphanumeric characters |

In an exemplary embodiment, a Decryption key and Data password(s) are needed in order to read the data from the BARB Badge 100 as all data is password protected and encrypted (prior to being written). In order to access and read this data, a valid password (i.e., one which matches the stored data element password) must be provided. The data will be decrypted by the requesting application. Once these steps have been performed, the data is ready to be provided to the requesting application.

A BARB Badge interface may also perform a data 'Pre-Read', when activated. This allows data elements to be read off the BARB Badge 100 and cached in anticipation of a request from the application. Upon determination that a new BARB Badge 100 is present, the BARB Badge interface performs a read of the two data fields listed in Table 3. These are held until a request for this information is received from the application, at which time the data is forwarded to the application without the need to further query the BARB Badge 100. In addition to the cached data, the time cached should also be stored. Pre-read data stored in memory is updated if any of the pre-read fields are updated on the BARB Badge 100 (i.e., data rewritten by the interface). This should only occur on a "password update attempt". Pre-read data is not released if the "Expiration" time is reached.

The Write to BARB Badge 1706 sub-function writes data to the storage area of the BARB Badge 100. The data written is the same as that described above for the 'Read BARB Badge' 1704 sub-function. In order to perform the Write operation, the BARB Badge 100 must be present. In an exemplary embodiment, data is previously encrypted by the application and the sub-function stores the data with the proper tags and passwords.

The Maintain BARB Badge State 1708 sub-function maintains a BARB Badge state table as to which BARB Badge 100 are present at a given point in time and what their current status is. In an exemplary embodiment, the information maintained in the state table for each BARB Badge 100 present includes:

BARB Badge serial number: manufacturer's serial number of BARB Badge 100

BARB Badge status: specific status bits

Time first appearing: time the BARB Badge 100 presence first detected (this session)

Time most recently seen: most recent presence detection (this session)

BARB Badge status includes the following data:

Reset status—1 bit: true or false Initialized—1 bit: true or false

BARB Badge 100 on person—1 bit: true or false

BARB Badge 100 removal confidence—3 bits (high value high confidence that BARB Badge 100 has been removed)

Activation indicator—1 bit: activated=true; not activated=false

ID card inserted—1 bit: inserted=true; not inserted=false

ID card removed since activation—1 bit: removed at least once=true; never removed=false Battery low indicator—1 bit: low=1 (battery charge<4); OK=0

Battery charge level—3 bits (0=discharged; 7=fully charged)

Time to live indicator—1 bit: expired=true; not expired=0

In an exemplary embodiment, the order of the state table is from first appearing BARB Badge 100 to the last appearing, and will be updated whenever any new information becomes available. In particular, new BARB Badges 100 appearing are added to the bottom of the state table, along with their time of appearance and current status; old BARB Badges 100 detected to have left the area (no longer present, after flicker delay) are removed from the list; and existing BARB Badges 100 with continuing presence will be updated as to most recent time seen and any changes in status bits. In addition, the BARB Badge state table will be passed along to other functions or the application upon request.

The Receive Event 1710 sub-function, for BARB Badges 100 which broadcast their presence, acts as the receiver of that event. Events are received from the BARB Badge software. The Receive Event 1710 sub-function will pass pertinent data along to other functions, which maintain state or interface with the application to notify it of significant events, such as the Enumerate BARB Badge sub-function 1702.

The Poll BARB Badge 1712 sub-function will periodically poll the BARB Badges 100 which do not broadcast their presence to determine their presence, via the BARB Badge software. In an exemplary embodiment, the polling is done by circulating through a list of BARB Badge serial numbers. The list of BARB Badge serial numbers is read from the INI file (shown in Tables 14A–C, infra) during start-up. The polling is continuous, with a single cycle time depending on the response time of the BARB Badge 100 technology. The polling interval will be set in the INI file (shown in Tables 14A–C infra). During the polling, as BARB Badges 100 are determined to be present or not present, this information is passed back to other functions which maintain state or interface with the application to notify it of significant events, such as the Enumerate BARB Badge sub-function 1702.

In an exemplary embodiment, the BARB Badge 1718, is a COTS product provided by the BARB Badge manufacturer as a means of interfacing with the particular BARB Badge technology. The interface conforms to the BARB Badge software and uses the available functions and capabilities to perform the functions described in the BARB Badge technology functions described above In an exemplary embodiment, the BARB Badge 100 includes the following features and capabilities: Broadcast presence or intelligent polling of BARB Base 110, significant on-board memory and processing power, on-board encryption supporting encrypted secure communication with the host (encryption capability may be incorporated in a vendor supplied BARB Base 110 or may be provided in software running on the workstation), on-board sensors and indicators (visible and/or audible), on-board clock, support a timeout functionality (e.g., Time-to-Live), ability to detect presence on a body (instantaneous measurement), removal from the user's body and insertion of ID BARB Badge 100 (instantaneous measurement), as well as the ability to determine that the ID BARB Badge 100 had been removed and to self-deactivate (e.g., due to removal, due to expired Time-to-Live, etc.).

Returning to FIG. 5, the details of the operations of the biometric Server 508 will now be explained in greater detail. In an exemplary embodiment, the biometric server 508 is a COTS product whose specifications are delineated in commercial documentation. The functions of the biometric server application include: 1) performing additions and deletions of user records from the biometric enrollment database, and 2) conducting biometric verifications to determine if a captured biometric sample matches the previously enrolled sample for the claimed identity.

Figure 18:
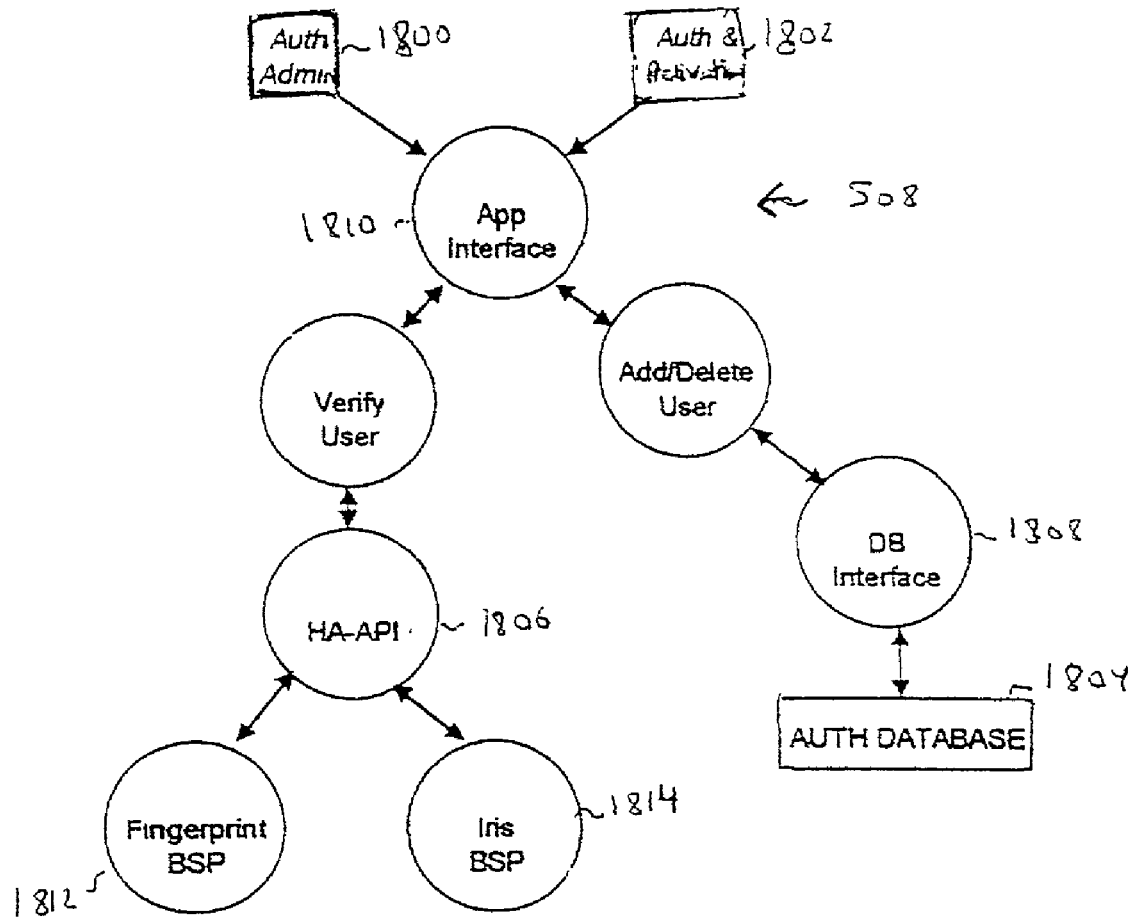
FIG. 18 is a data flow diagram for the biometric server function in accordance with one embodiment of the present invention.
Figure 19:
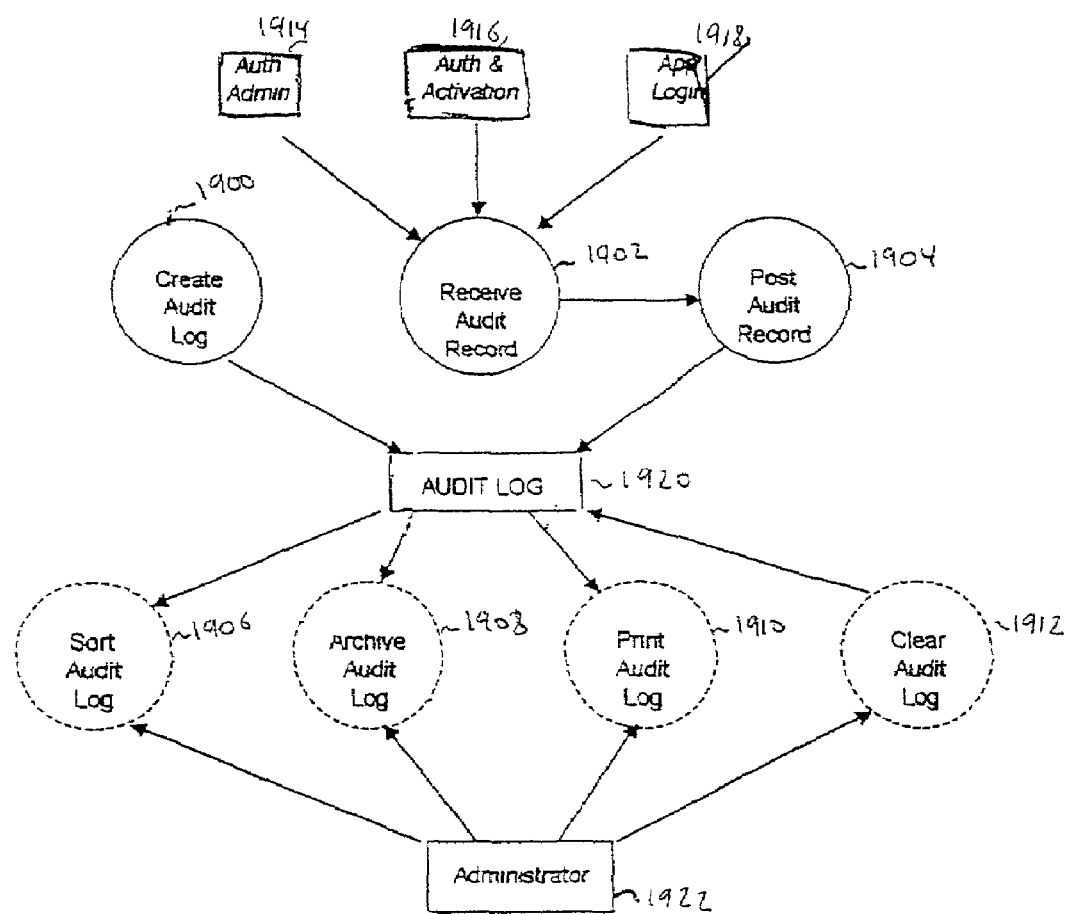
FIG. 19 is a functional flow diagram for the audit function in accordance with one embodiment of the present invention.

FIG. 18 is a data flow diagram for the biometric server function. As shown the biometric server 508 interfaces via App Interface 1810 with the authentication administration function 1800 to perform biometric enrollments and maintenance of the user biometric records and with the authentication & activation application 1802 to perform biometric authentications, and with the authentication database 1804 for storage and retrieval of user biometric data via DB Interface 1808. The biometric server 508 conforms to the appropriate biometric API 1806 in order to interface to the installed biometric BSP technologies, such as Fingerprint BSP 1812 and Iris BSP 1814 which perform the actual matching operations.

In an exemplary embodiment, in order for a biometric verification to occur, the following must happen: the user is enrolled in the biometric technology to be verified, and the biometric technology used to perform the biometric capture and processing at the workstation is also installed on the biometric server (less capture device). In addition, the biometric data stored within the authentication database 1804 by the Biometric Server 508 will be encrypted prior to transmission and storage, such as by using RSA RC4 128-bit encryption or an equivalent. Secure communication with the client applications are also encrypted such as by using RSA RC4 128-bit encryption with session keys using Diffie-Hellman key exchange. The biometric server 508 and authentication database 1804 may, if desired, execute on the same platform, which is optionally replicated for redundancy/failover purpose.

Another feature of the administrator subsystem not shown in FIG. 5 may include an auditing function that execute as a separate DLL on the local workstation hosting one or more of the three main applications of administration 500, authentication and activation 502 and login 504, with local text files being generated. In an exemplary embodiment, the auditing function collects audit event information from all of the other system functions and post it to an audit log file. As shown in the functional flow diagram of FIG. 19, the auditing function include the following sub-functions: 1) create audit log 1900, 2) receive audit record 1902, 3) post audit record 1904, 3) sort audit log 1906, 4) archive audit log 1908, 5) print audit log 1910 and 6) clear audit log 1912 The details of each of these sub-functions will now be explained in greater detail.

The Create Audit Log 1900 sub-function, upon activation of the audit function, will check to determine if the audit log (text file) exists. If the file exists, then this sub-function does nothing. If the file does not exist, it is created by this sub-function. The first entry into the audit log will be the creation event.

In Receive Audit Record 1902 sub-function, when one of the system applications creates an entry for the audit log, it is packaged and sent to the auditing function. The package may contain one or more audit records. All audit records include: Date/time of event, Event tag, User ID (or N/A), workstation ID (host name), BARB Badge 100 Serial Number (or N/A), BARB Badge 100 status bytes, posting application ID, and Event data.

Application IDs are assigned according to Table 4 shown below:

TABLE 4

| Application | ID |
| --- | --- |
| Authentication Administration | ADM |
| Authentication & Activation | A & A |
| Application Login Enhancement | ALE |
| BARB BADGE Interface | BIF |

Events to be audited include the following:

TABLE 5

| Event tag | Event | Event Data |
| --- | --- | --- |
| 000 | Audit log creation | |
| A01 | Administrator logon to Authentication Administration application | Admin ID |
| A02 | User created | User ID |
| A03 | User deleted | User ID |
| A04 | User edited | User ID |
| A05 | BARB BADGE created | BARB BADGE ID |
| A06 | BARB BADGE removed from service | BARB BADGE ID |
| A07 | BARB BADGE revoked | BARB BADGE ID |
| A08 | BARB BADGE reinstated | BARB BADGE ID |

TABLE 5-continued

| Event tag | Event | Event Data |
|---|---|---|
| A09 | BARB BADGE turned in | BARB BADGE ID |
| A10 | User biometric enrollment | User ID, BUID of enrollment technology |
| A11 | Change in biometric preference | User ID |
| B01 | BARB BADGE activation initiated | User ID, BARB BADGE ID |
| B02 | BARB BADGE activation successful | User ID, BARB BADGE ID, TTL |
| B03 | BARB BADGE activation unsuccessful | User ID, BARB BADGE ID<br>01-Failed BARB BADGE presence<br>02-BARB BADGE number mismatch<br>03-BARB BADGE # does not exist<br>04-BARB BADGE already assigned<br>05-BARB BADGE invalid<br>06-Low battery<br>07-BARB BADGE not on person<br>08-ID not inserted<br>09-User does not exist<br>10-User already has active BARB BADGE<br>11-Exceeded max # unreturned BARB BADGE<br>12-Failed credential check (password no-match)<br>13-No biometrics enrolled<br>14-Biom tech not installed<br>15-Failed biometric auth (no-match)<br>16-Failed BARB BADGE write<br>17-User cancelled activation |
| B04 | Password change-successful | User ID<br>Change type:<br>01 = User initiated<br>02 = System initiated |
| B05 | Password change-unsuccessful | User ID<br>Change type:<br>01 = User initiated<br>02 = System initiated<br>Failure reason:<br>01-Old password invalid<br>02-New password unacceptable<br>03-User cancellation |
| B06 | BARB BADGE deactivation by user | User ID, BARB BADGE ID |
| B07 | Biometric capture | User ID, BUID, Biometric Type |
| C01 | BARB BADGE login successful | User ID, BARB BADGE ID |
| C02 | BARB BADGE login-unsuccessful | User ID, BARB BADGE ID<br>01-syntax error<br>02-credential error |
| C03 | User logoff | User ID, BARB BADGE ID |
| C04 | BARB BADGE state table update | New state table |
| C05 | Password update | User ID, BARB BADGE ID<br>Results:<br>1 = successful<br>0 = unsuccessful |
| T01 | Biometric technology failure | BUID, Error code |
| T02 | BARB BADGE technology failure | BARB BADGE type, Error code |
| T03 | Biometric server failure | Error code (if available) |
| T04 | Network failure | |

The Post Audit Record 1904 sub-function posts the audit records to a local disk file. In an exemplary embodiment, the audit log is 140 byte, tab delimited text file, and suitable for import into a spreadsheet or database. All event data (other than User ID and BARB Badge ID, which have their own fields) will be tagged and/or coded. As records are received, they are appended to the existing audit file.

In an exemplary embodiment, in addition to the customized audit log capability described above, the authentication and activation application will also post specific (relatively high level, user related) transaction type events to the management subsystem log. All management subsystem log postings will also be recorded in the authentication audit log. The events to be recorded in management subsystem log may include: 1) activate session events such as database query to check BARB Badge 100 availability, validate and initialize BARB Badge 100, check entrust credentials, biometric authentication—Fingerprint and Iris, upload and activate BARB Badge 100 and database update—BARB Badge 100 activation/assignment status; 2) deactivate session events such as database query to check BARB Badge 100 availability, initialize BARB Badge 100, and database update—BARB Badge status; and 3) password change session events such as credential and password change. In addition, for each of the above events, start and stop transactions will be logged. A separate transaction will be reported for each biometric authentication attempt. Additional features include utilities to handle the created and populated text audit file, security features such as access control, confidentiality, and integrity protection.

As described previously, all data written to the BARB Badge 100 must be encrypted prior to writing to the BARB Badge 100 (and decrypted after reading from the BARB Badge 100). The key used to perform this must be generated, stored, and disseminated centrally, so that a BARB Badge 100 written to at one workstation may be read at another. To this end, other functions of the system include BARB Badge encryption key management, and BARB Badge parameter adjustment which are explained below in greater detail.

A BARB Badge Key Management utility application runs on the biometric server platform and utilize the authentication database as the storage location. Upon initialization, the authentication and activation and Login Extension applications will retrieve the current key from the repository. In an exemplary embodiment, a Key Manager sub-function will randomly generate 128-bit keys using the facilities of the operating system cryptography API functions. RSA RC4 symmetric keys will be used. The key itself will be encrypted prior to storage. Protection of this key will be via the same mechanism as used by the biometric server for the biometric data. Keys will be stored in encrypted form within the authentication database. Password access control will also be in place. The key will also be written to a floppy disk for key escrow purposes. Keys will only be disseminated to authorized applications based on a shared secret. Keys will be disseminated via secure channels only.

In the BARB Badge Parameter Adjustment function, through the BARB Badge software, the properties of the BARB Badge 100 transceiver can be adjusted to the configuration and unique characteristics of the room/environment in which it is installed. In an exemplary embodiment these properties can be "manually" adjusted at a given workstation location. Properties to be adjusted include: BARB Base 110 sensitivity, BARB Badge transmit power, visibility timeout, and lost BARB Badge timeout. Default values for these parameters are stored such as in an INI file, shown in Tables 14A–C infra. Adjusted values will overwrite the defaults. Parameters which will only be stored and accessed include: flicker filter delay timeouts, BARB Badge 100 maximum delay, BARB Badge 100 polling interval, Retransmission retry counter, and BARB Base 110 receiver attenuation.

Returning to FIG. 5, the database server 520 provides a common interface from the various applications to the biometrics and BARB Badge database 510 for secure access to user and BARB Badge information. The biometric server 508 provides access to the biometric portion of the database. In an exemplary embodiment, the database server 520 is located on the same platform as the biometric server 508 and shares a common database. Additionally, secure communication from the applications to the database server will be encrypted such as using RSA RC4 128-bit encryption with session keys, using Diffie-Hellman key exchange. Sensitive data (i.e., administrator passwords) will be encrypted when stored, such as by using RSA RC4 128-bit encryption.

Tables 6–15 presented below illustrate exemplary data elements used with the various exemplary embodiments of the invention as described above.

Authentication Database Data Elements:

I. User Data: Biometric Preference

TABLE 6

| Field Name | Field Size | Field Type | Description |
| --- | --- | --- | --- |
| User ID | 30 A/N | String | A unique string value consisting of a beginning alpha character followed by 29 alpha-numeric characters. |

TABLE 6-continued

| Field Name | Field Size | Field Type | Description |
| --- | --- | --- | --- |
| Biometric Preference | 128-bit | Binary/Hex | BUID of preferred biometric technology. |
| Account password | 16 B | Binary | Not used. |

BUD = Biometric Unique Authentication and identifier

II. Administrator Data

TABLE 7

| Field Name | Field Size | Field Type | Description |
| --- | --- | --- | --- |
| User ID | 30 A/N | String | A unique string value consisting of a beginning alpha character followed by 29 alpha-numeric characters. |
| Last Name | 35 B | String | User's family name. |
| First Name | 25 B | String | User's given name. |
| Middle Initial | 1 B | Char | User's middle initial. Blank if none. |
| Title | 6 B | String | User's title. |
| Department | 30 B | String | Name or number of user's assigned department. |
| Phone Number | 15 B | String | User's office phone number (numeric). |
| Tie Line | 3 B | String | User's tie line prefix. |
| Email Address | 48 B | String | User's email address. |
| Password | 16 B | Binary (encrypted) | Administrator's backup password for access to the Auth Admin application. |

III. Barb Badge Data a. Inventory

TABLE 8A

| Field Name | Field Size | Field Type | Description |
| --- | --- | --- | --- |
| BARB BADGE Serial Number | 4 B | Ulong | A unique number assigned by the BARB BADGE manufacturer (in BARB BADGE ROM and visually readable on BARB BADGE surface). |
| BARB BADGELogical ID | 1 B | Integer | BARB BADGE number assigned by administrator [May also be affixed to BARB BADGE. |
| BARB BADGE Type | 4 B | String | Type of BARB BADGE technology (HPIR). | b. Status

TABLE 8B

| Field Name | Field Size | Field Type | Description |
|---|---|---|---|
| ARB BADGE Serial Number | 4 B | Ulong | The manufacturer's serial number of the BARB BADGE |
| BARB BADGE Assignment Status | 1 B | Char | 1 = "assigned"<br>2 = "available"<br>3 = "out of service" |
| BARB BADGE Activation Status | 1 B | Char | 1 = "activated"<br>2 = "deactivated"<br>3 = "revoked"<br>4 = "inactive" |
| User ID Assigned | 30 A/N | String | A unique string value consisting of a beginning alpha character followed by 6 numeric characters. |
| Date/time of activation. | 8 B | Datetime | Date and time of most recent activation (GMT). |
| Date/time of expiration | 8 B | Datetime | Date and time of expiration for most recent activation (GMT). |
| Last turn-in time | 8 B | Datetime | Date and time (GMT) that BARB BADGE 100 was most recently returned. |
| Comment | 79 B | String | BARB BADGE annotation, particularly why a BARB BADGE was removed from service. |

IV. Biometrics a. Data

TABLE 9A

| Field Name | Field Size | Field Type | Description |
|---|---|---|---|
| User ID | 30 A/N | String | A unique string value consisting of a beginning alpha character followed by 6 numeric characters |
| Biometric Technology ID | 4 B | Integer | BUID of creating BSP |
| BIR | variable | Binary | Biometric Authentication and identifier Record containing the enrolled biometric template(s) created by the enrolling BSP. |
| Raw BIR | Variable | Binary | Not used. |

BUID = Biometric Unique Authentication and identifier
BSP = Biometric Service Provider
BIR = Biometric Identification Record b. Cross-Reference Data Stored on the Barb Badge:

TABLE 10A

| Data Tag (ulong) | Data Element | Description | Format |
|---|---|---|---|
| UID | User ID | User ID of the user to which the BARB BADGE has been assigned as a result of a successful activation. | annnnnn |
| UPW | User Password | Password of the user to which the BARB BADGE 100 has been assigned as a result of a successful activation. | 8–16 alphanumeric Characters |
| TTL | Time-to-Live/ Expiration date/time | Time at which the BARB BADGE will become expired/inactive. | DTG |

TABLE 9B

| Field Name | Field Size | Field Type | Description |
|---|---|---|---|
| Biometric Technology ID | 4 B | Integer | BUID of BSP |
| Biometric Type | 2 B | Mask | Type of biometric technology (i.e., fingerprint, face, voice, iris . . .) |

BUID = Biometric Unique Authentication and identifier

For the BARB Badge, the 2 16-bit registers will be populated as follows:

Register 1: UUUUUUU SSSSDDDD

0123456701234567

Register 2: PPPPPPPPPPPPPPPP

Where:

TABLE 10B

| | |
|---|---|
| UUUUUUUUUUUUUUUUUUUUUUUUUUUUUU | User ID |
| SSSS | Status Bytes |
| DDDD | Time to Live (date/time) |
| PPPPPPPPPPPPPPPP | Password |

Audit Log:

TABLE 11

| Field Name | Field Size | Field Type | Description |
|---|---|---|---|
| Event Tag | 3 B | String | Tag identifying type of even) |
| Date/time of Event | 14 B | String | Date and time the event occurred (YYYYMMDDHHMMSS) |
| User ID | 30 A/N | String | A unique string value consisting of a beginning alpha character followed by 6 numeric characters. |
| Workstation ID | 32 B | String | Host name of workstation where event occurred |
| BARB BADGE Serial Number | 10 B | String | A unique number assigned by the BARB BADGE manufacturer (in BARB BADGE ROM and visually readable on BARB BADGE surface). |
| BARB BADGE Status | 10 B | Binary | Specific BARB BADGE status bits (each field converted into bytes). |
| Posting Application ID | 3 B | String | Assigned authentication and identifier of application detecting event and posting record to audit log. |
| Event Data | 51 B | String | Data specific to event (field tagged) or text explanation. |

Other Data Stored:

I. Barb Badge a. State Table

TABLE 12A

| Field Name | Field Size | Field Type | Description |
|---|---|---|---|
| BARB BADGE Serial Number | 4 B | Ulong | A unique number assigned by the BARB BADGE manufacturer (in BARB BADGE ROM and visually readable on BARB BADGE surface). |
| BARB BADGE Status | 2 B | Binary | Specific status bits (see definition below). |
| Time First Appearing | 8 B | Datetime | Date and time the BARB BADGE presence was first detection (this session) |
| Time Most Recently Seen | 8 B | Datetime | Date and time of most recent presence detection (this session). | b. Status Bits

TABLE 12B

| Field No. | No. of Bits | Field Name | Description |
|---|---|---|---|
| 1 | 1 | Reset status | True/false |
| 2 | 1 | Initialization Indicator | True/False |
| 3 | 1 | On-person (instantaneous) | 1 = Currently on person<br>0 = Currently not on person |
| 4 | 3 | Removal probability (determined over time) | High value = high probability that BARB BADGE 100 has been removed from person at some time since reset. (7 = definitely removed, 0 = definitely not removed) |
| 5 | 1 | Activation indicator | 1 = activated<br>0 = not activated |
| 6 | 1 | ID inserted (instantaneous) | 1 = inserted<br>0 = not inserted |
| 7 | 1 | ID removed (determined over time) | 1 = removed at least once<br>0 = never removed |

TABLE 12B-continued

| Field No. | No. of Bits | Field Name | Description |
|---|---|---|---|
| 8 | 1 | Battery low indicator | 1 = low battery (Field 9 < 4) 0 = battery OK |
| 9 | 3 | Battery charge level | High value = fully charged 0 = discharged |
| 10 | 1 | Time to live indicator | 1 = TTL expired 0 = TTL not expired |

II. Key Repository

TABLE 13

| Field Name | Field Size | Field Type | Description |
|---|---|---|---|
| Encryption Key | 16 B | Ulong | A unique number assigned by the BARB BADGE manufacturer (in BARB BADGE ROM and visually readable on BARB BADGE surface). |

III. INI Files a. INI File

TABLE 14A

| Field Name | Field Size | Field Type | Description |
|---|---|---|---|
| BARB BADGE repositioning timeout | 1 B | Integer | Length of time that the system will wait when attempting to detect the presence of a BARB BADGE before timing out (default = 60 sec) |
| Enable battery check | 1 B | Boolean | True (1) indicates that a battery check is to be performed; False (0) indicates that no check is to be attempted (default = 1). |
| Minimum battery charge level | 1 B | Integer | Value between 0–7 indicating the minimum value for which the battery is considered to be adequately charged for activation (default = 3). |
| Enable on-person check | 1 B | Boolean | True (1) indicates that the on-person check is to be performed; False (0) indicates that no check is to be performed (default = 1). |
| Enable on-person confidence check | 1 B | Boolean | True (1) indicates that the on-person confidence check is to be performed; False (0) indicates that no check is to be performed (default = 1). |
| Maximum on-person/removal confidence | 1 B | Integer | Value between 0–7 indicating the minimum acceptable confidence that the BARB BADGE has not been removed since activation (default = 3). |
| Enable BARB BADGE inserted check | 1 B | Boolean | True (1) indicates that the BARB BADGE inserted check is to be performed; False (0) indicates that no check is to be performed (default = 1). |
| Enable BARB BADGE removed check | 1 B | Boolean | True (1) indicates that the BARB BADGE removed check is to be performed; False (0) indicates that no check is to be performed (default = 1). |
| Maximum unreturned BARB BADGE subsystem | 1 B | Integer | Maximum number of unreturned BARB BADGE allowed for a user ID before no further new BARB BADGE activations are allowed (default = 3). |
| BARB BADGE cloaking time | 1 B | Integer | Number of seconds that a present BARB BADGE will be ignored for automatic login purposes (default = 20). |
| Default time to live | 4 B | Integer | Default value of BARB BADGE time-to-live for a given user (hours). Default = 12 hours. |
| Maximum time to live | 4 B | Integer | Maximum allowable BARB BADGE time-to-live (hours). Default = 48 hrs. |
| Biometric server address (primary) | 25 B | String | The host name of the primary biometric server. |
| Biometric server address (secondary) | 25 B | String | The host name of the backup biometric server. |
| Biometric database name | 25 B | String | Name of authentication database. |
| Failover timeout | 1 B | Integer | Timeout period after making a request to the primary server and re-initiating that request to the secondary server. In milliseconds default = 0). |
| Password update timeout | 1 B | Integer | Length of time between failed auto login and successful manual login, within which a password update attempt will be performed (in seconds). Default = 20 seconds. |
| Enable auto logoff | 1 B | Boolean | True (1) = enabled False (0) = disabled Default = 0. |
| Verification INI filename | 12 B | String | Name of file to be used to setup entrust interface. | b. Environmental INI File

TABLE 14B

| Field Name | Field Size | Field Type | Description |
|---|---|---|---|
| Flicker filter period | 1 B | Integer | Time period (in milliseconds) within which a loss of BARB BADGE detection is considered an anomaly and is not reported as a BARB BADGE departure. Default = 3000 ms. |
| BARB Base Sensitivity | 1 B | Integer | HP BARB BADGE 100 only. Sensitivity setting for IR receiver. |
| BARB Base Receiver Attenuation | 1 B | Integer | Setting for BARB Base 110 RF receiver attenuation. |
| BARB BADGE Power Setting | 1 B | Integer | HP BARB BADGE 100 only. Transmitter power output setting. |
| Retransmission Retry Counter | 1 B | Integer | Maximum number of retries when transmission errors are detected. |
| Visible Timeout | 1 B | Integer | |
| Lost BARB BADGE Timeout | 1 B | Integer | | c. Barb Badge INI File

TABLE 14C

| Field Name | Field Size | Field Type | Description |
|---|---|---|---|
| BARB BADGE serial number #1 | 4 B | Ulong | Serial number of BARB BADGE in inventory (for polling list). |
| BARB BADGE serial number #2 | 4 B | Ulong | Serial number of BARB BADGE in inventory (for polling list). |
| BARB BADGE serial number #N | 4 B | Ulong | Serial number of BARB BADGE in inventory (for polling list). |
| BARB BADGE polling interval | 4 B | Ulong | Time between successive polls (ms), (default = 100). |

IV. Logins a. State Table

TABLE 15A

| Field Name | Field Size | Field Type | description |
|---|---|---|---|
| Login state | 1 B | Integer | 1 = Ready<br>2 = Busy<br>3 = Wait |
| Current login ID | 30 A/N | String | User ID of currently logged in user. Blank if no user logged in. |
| Current login BARB BADGE | 4 B | Ulong | Serial number of BARB BADGE currently logged in. Blank if no user logged in. |

BARB BADGE = Portable User authentication and Identification System b. Candidate List

TABLE 15B

| Field Name | Field Size | Field Type | Description |
|---|---|---|---|
| User ID | 30 A/N | String | A unique string value consisting of a beginning alpha character followed by 6 numeric characters. |
| BARB BADGE number | 4 B | Ulong | A unique number assigned by the BARB BADGE manufacturer |
| Cloaking indicator | 1 B | Boolean | 0 = not cloaked<br>1 = cloaked |
| Cloak start time | 4 B | Long | Time when cloaking began. |
| Notification indicator | 1 B | Boolean | Indicates whether the application has been notified of this user.<br>0 = not notified<br>1 = notified |
| No-login indicator | 1 B | Boolean | Indicates if BARB BADGE is on no-login list.<br>0 = not on list<br>1 = on list |

It should be noted that the data elements illustrated in foregoing tables are meant to exemplary only and that the present invention is not limited to the features disclosed therein.

Other embodiments of the invention include but are not limited to incorporation of user aliases, application driven policies, 3$^{rd}$ party failure, over/load balancing, programmed API for data upload/distribution, security features—such as admin logon, mutual authentication, trusted path, BARB Badge 100 removal detection, audit of who is in any given area at any time, the present location of all BARB Badges 100, BARB Badge 100 deactivation/reactivation by user, auto logoff, complex security policies with context and state, incorporation of user groups, periodic database encryption key changes, more sophisticated key distribution, biometric API compliance, BSP improvements such as indicating which fingers/eyes enrolled, allowed update of single template, more secure channel between BARB Badge interface and BARB Badge software, reading/writing of large data blocks to BARB Badge 100, asynchronous read/write to BARB Badge software, use of BARB Badge advanced features such as speaker/microphone, LEDs, etc., utilizing a Unix-based biometric server and using open system enterprise database and associated hardware and software capabilities for achieving the same, are all anticipated to be within the scope of the present invention.

In accordance with the foregoing detailed description of an embodiment of the invention it is now clear that the invention provides a number of inventive features, including, but not limited to:

Automatic logon and logoff for multiple applications;
Individual localization;
Tracking and logging of others present;
Warning of unauthorized possession or location of a BARB Badge;
Warning of disassociation of a BARB Badge from an authorized user;
Detection of user orientation in the environment;
Elimination of the need to learn multiple passwords;
Ability of the BARB Badge to function for only a predetermined period of time;
Remote deactivation of a BARB Badge;
Warning to others of unauthorized BARB Badge status;
Multiple authentication schemes such as biometrics;
Strong authentication, which is portable;
Linkable to physical identity badges;
Programmable audio and visual indicators;
A robust software API and calls for interfacing with extant security systems;
Compatibility with both centralized or decentralized security systems; and
Ability to track changes of location and transit times between locations of a BARB Badge holder.

It should be noted that the various features of the foregoing embodiments were discussed separately for clarity of description only and they can be incorporated in whole or in part into a single embodiment of the invention having all or some these features. It should further be noted that the invention is not limited to use in a health care facility but can readily be used in conjunction with virtually any computer-based networked system in which users can access the system via different access ports. For example, it could work in a corporate setting, a military setting, a university setting, and the like.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A system for detecting the identity and location of a person comprising, in combination:
a portable communications unit worn on the body of said person, said communications unit including:
a memory for storing identification data uniquely identifying said person,
a first radio device, and
a first infrared device;
a base station including:
a second radio device for detecting the presence of said first radio device within radio range of said second radio device, and
a second infrared device for detecting the presence of said first infrared device within line of sight range of said second infrared device; and
a computing system coupled to said base station for performing one or more functions when said first radio device is within radio range of said second radio device and said first infrared device is within line of sight range of said second infrared device.

2. A system for detecting the identity and location of a person as set forth in claim 1 wherein said portable communications unit further includes means for detecting the removal of said communications unit from the body of said person.

3. A system for detecting the identity and location of a person as set forth in claim 2 wherein said communication unit further includes means for preventing said identification data from being retrieved from said memory in response to the detection of the removal of said communications unit from the body of said person.

4. A system for detecting the identity and location of a person as set forth in claim 2 wherein said portable communications unit further includes means for transmitting a signal to said computing system in response to the detection of the removal of said communications unit from the body of said person.

5. A system for detecting the identity and location of a person as set forth in claim 2 wherein said system includes means for verifying the identity of said person before storing said identification data in said memory.

6. A system for detecting the identity and location of a person as set forth in claim 5 wherein said means for verifying the identity of said person includes a biometric sensor for obtaining biometric data from the body of said person and means comparing said biometric data with previously stored biometric data identifying said person.

7. A system for detecting the identity and location of a person as set forth in claim 6 wherein said biometric data is fingerprint data.

8. A system for detecting the identity and location of a person as set forth in claim 6 wherein said biometric data is iris scan data.

9. A system for detecting the identity and location of a person as set forth in claim 2 wherein said portable communication unit further includes means for actuating an alarm device in response to the removal of said communications unit from the body of said person.

10. A system for detecting the identity and location of a person as set forth in claim 9 wherein said alarm device includes an audible alarm generator forming part of said portable communication unit.

11. A system for detecting the identity and location of a person as set forth in claim 1 wherein said identification data includes a stored password known to said person and wherein one of said one or more functions include requesting and accepting the entry of a user-supplied password for comparison with said stored password to confirm the identity of said person.

12. A system for detecting the identity and location of a person as set forth in claim 1 wherein said system includes means for verifying the identity of said person before storing said identification data in said memory.

13. A system for detecting the identity and location of a person as set forth in claim 12 wherein said means for verifying the identity of said person includes obtaining biometric data from the body of said person and comparing said biometric data with previously stored biometric data identifying said person.

14. A system for detecting the identity and location of a person as set forth in claim 1 wherein said one or more functions includes retrieving identification data from said memory in said portable communications unit and enabling said computing system to perform operations which the person designated by said identification data is authorized to perform.

15. A system for detecting the identity and location of a person as set forth in claim 1 wherein said one or more functions includes providing information to said person.

16. A system for detecting the identity and location of a person as set forth in claim 15 wherein said one or more functions further includes accepting data entered by said person.

17. A system for detecting the identity and location of a person as set forth in claim 1 wherein said one or more functions includes accepting data entered into aid computing system by said person.

18. A system for detecting the identity and location of a person as set forth in claim 1 wherein said portable communications unit further includes a communications subsystem for establishing a data communications link with said computing system via said base station, said communication link employing either a radio data link between said first and second radio devices, or an infrared data link between said first and second infrared devices, or both said radio data link and said infrared data link.

19. A system for detecting the identity and location of a person as set forth in claim 18 wherein said computing system includes means for verifying the identity of said person upon whose body said communications unit is being worn and means for transmitting said identification data via said data communications link to said portable communications unit for storage in said memory.

20. A system for detecting the identity and location of a person as set forth in claim 19 wherein said means for verifying the identity of said person includes obtaining biometric data from the body of said person and comparing said biometric data with previously stored biometric data identifying said person.

21. A system for detecting the identity and location of a person as set forth in claim 20 wherein said portable communications unit further includes means for detecting the removal of said communications unit from the body of said person.

22. A system for detecting the identity and location of a person as set forth in claim 21 wherein said portable communications unit further includes means for transmitting a signal to said computing system via said data communications link in response to the detection of the removal of said communications unit from the body of said person.

23. A system for detecting the identity and location of a person as set forth in claim 21 wherein said communication unit further includes means for preventing said identification data from being retrieved from said memory in response to the detection of the removal of said communications unit from the body of said person.

24. A system for detecting the identity and location of a person as set forth in claim 19 wherein said portable communications unit further includes means for detecting the removal of said communications unit from the body of said person.

25. A system for detecting the identity and location of a person as set forth in claim 24 wherein said portable communications unit further includes means for transmitting a signal to said computing system via said data communications link in response to the detection of the removal of said communications unit from the body of said person.

26. A system for detecting the identity and location of a person as set forth in claim 24 wherein said communication unit further includes means for preventing said identification data from being retrieved from said memory in response to the detection of the removal of said communications unit from the body of said person.

27. A system for detecting the identity and location of a person as set forth in claim 1 wherein said computing system includes a database for storing data indicating whether a particular person is authorized to be in an area in the vicinity of said base station, means for comparing identification data received from said memory with said database, and means for issuing a notification alert if said person is not authorized to be in said area.

* * * * *